(12) United States Patent
Tang

(10) Patent No.: US 12,313,823 B2
(45) Date of Patent: May 27, 2025

(54) CAMERA OPTICAL LENS

(71) Applicant: AAC Optics (Suzhou) Co., Ltd., Suzhou (CN)

(72) Inventor: Han Tang, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 502 days.

(21) Appl. No.: 17/741,491

(22) Filed: May 11, 2022

(65) Prior Publication Data

US 2023/0314770 A1 Oct. 5, 2023

(30) Foreign Application Priority Data

Mar. 29, 2022 (CN) .......................... 202210317764.8

(51) Int. Cl.
*G02B 13/00* (2006.01)
*G02B 9/60* (2006.01)

(52) U.S. Cl.
CPC ........... *G02B 13/0045* (2013.01); *G02B 9/60* (2013.01)

(58) Field of Classification Search
None
See application file for complete search history.

(56) References Cited

U.S. PATENT DOCUMENTS

| | | | | |
|---|---|---|---|---|
| 2009/0052057 A1* | 2/2009 | Lin | .......................... | G02B 13/06 359/751 |
| 2010/0188757 A1* | 7/2010 | Saitoh | ................ | G02B 13/0045 359/715 |
| 2010/0254025 A1* | 10/2010 | Yoshida | ................ | G02B 13/18 359/717 |
| 2011/0102541 A1* | 5/2011 | Jin | .......................... | G02B 9/56 359/717 |
| 2012/0275037 A1* | 11/2012 | Kubota | .............. | G02B 13/0045 359/753 |
| 2014/0204478 A1* | 7/2014 | Asami | ................ | G02B 13/0045 359/752 |
| 2015/0116569 A1* | 4/2015 | Mercado | ............ | G02B 13/0045 348/335 |
| 2015/0185445 A1* | 7/2015 | Ahn | ....................... | G02B 13/06 359/753 |
| 2017/0010446 A1* | 1/2017 | Liu | .................... | G02B 13/06 |
| 2017/0184812 A1* | 6/2017 | Yoon | ...................... | G02B 5/208 |
| 2018/0017766 A1* | 1/2018 | Tang | ................... | G02B 27/0025 |
| 2019/0094492 A1* | 3/2019 | Nakamura | ......... | G02B 13/0045 |
| 2020/0081229 A1* | 3/2020 | Lai | .......................... | G02B 9/60 |

* cited by examiner

*Primary Examiner* — Ryan Crockett
(74) *Attorney, Agent, or Firm* — Wiersch Law Group

(57) ABSTRACT

The present invention discloses a camera optical lens including, from an object side to an image side in sequence: a first lens having a negative refractive power, a second lens having a negative refractive power, a third lens having a positive refractive power, a fourth lens having a negative refractive power, and a fifth lens having a positive refractive power. The camera optical lens satisfies the following conditions: $12.00 \leq TTL/f \leq 15.00$, $2.00 \leq f45/f \leq 6.00$, $0 \leq (R3+R4)/(R3-R4) < 1.00$, and $8.00 \leq d4/d6 \leq 30.00$. The camera optical lens according to the present invention has excellent optical characteristics, such as large aperture, wide angle, and ultra-thin.

9 Claims, 16 Drawing Sheets

CAMERA OPTICAL LENS

TECHNICAL FIELD

The present invention relates to the field of optical lens, and more particularly, to a camera optical lens suitable for handheld terminal devices, such as smart phones and digital cameras, and imaging devices, such as monitors, PC lenses and car lenses.

BACKGROUND

In recent years, with the rise of various smart devices, the demand for miniaturized camera optics has been increasing, and the pixel size of photosensitive devices has shrunk, coupled with the development trend of electronic products with good functions, thin and portable appearance. Therefore, miniaturized imaging optical lenses with good image quality have become the mainstream in the current market. In order to obtain better imaging quality, a multi-piece lenses structure is often used. Moreover, with the development of technology and the increase of diversified needs of users, as the pixel area of the photosensitive device continues to shrink and the system's requirements for image quality continue to increase, the five-element lenses structure gradually appears in the lens design. There is an urgent need for a wide-angle imaging lens with excellent optical characteristics, small size, and fully corrected aberrations.

SUMMARY

In the present invention, a cameral optical lens has excellent optical characteristics with large aperture, long focal length and low distortion.

According to one aspect of the present invention, a camera optical lens comprises, from an object side to an image side in sequence, a first lens having a negative refractive power, a second lens having a negative refractive power, a third lens having a positive refractive power, a fourth lens having a negative refractive power, and a fifth lens having a positive refractive power. The camera optical lens satisfies the following conditions: $12.00 \leqslant TTL/f \leqslant 15.00$, $2.00 \leqslant f45/f \leqslant 6.00$, $0 \leqslant (R3+R4)/(R3-R4) < 1.00$ and $8.00 \leqslant d4/d6 \leqslant 30.00$. f denotes a focal length of the camera optical lens, TTL denotes a total optical length of the camera optical lens, f45 denotes a combined focal length of the fourth lens and the fifth lens, R3 denotes a central curvature radius of an object side surface of the second lens, R4 denotes a central curvature radius of an image side surface of the second lens, d4 denotes an on-axis distance from an image side surface of the second lens to an object side surface of the third lens, d6 denotes an on-axis distance from an image side surface of the third lens to an object side surface of the fourth lens.

As an improvement, the camera optical lens further satisfies the following condition: $1.50 \leqslant R7/R8 \leqslant 8.00$, R7 denotes a central curvature radius of an object side surface of the fourth lens, R8 denotes a central curvature radius of an image side surface of the fourth lens.

As an improvement, the first lens has an object side surface being convex in a paraxial region and the first lens has an image side surface being concave in a paraxial region. The camera optical lens further satisfies the following conditions: $-12.74 \leqslant f1/f \leqslant -3.46$, $0.78 \leqslant (R1+R2)/(R1-R2) \leqslant 2.77$ and $0.04 \leqslant d1/TTL \leqslant 0.14$, f1 denotes a focal length of the first lens, R1 denotes a central curvature radius of an object side surface of the first lens, R2 denotes a central curvature radius of the image side surface of the first lens, and d1 denotes an on-axis thickness of the first lens.

As an improvement, the second lens has an object side surface being concave in a paraxial region and the second lens has an image side surface being concave in a paraxial region. The camera optical lens further satisfies the following conditions: $-6.08 \leqslant f2/f \leqslant -1.43$, and $0.03 \leqslant d3/TTL \leqslant 0.12$, f2 denotes a focal length of the second lens, and d3 denotes an on-axis thickness of the second lens.

As an improvement, the third lens has an object side surface being convex in a paraxial region. The camera optical lens further satisfies the following conditions: $1.50 \leqslant f3/f \leqslant 6.64$, $-15.66 \leqslant (R5+R6)/(R5-R6) \leqslant 0.21$, and $0.05 \leqslant d5/TTL \leqslant 0.32$, f3 denotes a focal length of the third lens, R5 denotes a central curvature radius of an object side surface of the third lens, R6 denotes a central curvature radius of an image side surface of the third lens, and d5 denotes an on-axis thickness of the third lens.

As an improvement, the object side surface of the fourth lens is convex in a paraxial region and the image side surface of the fourth lens is concave in the paraxial region. The camera optical lens further satisfies the following conditions: $-19.86 \leqslant f4/f \leqslant -0.91$ and $0.03 \leqslant d7/TTL \leqslant \leqslant 0.10$, f4 denotes a focal length of the fourth lens, d7 denotes an on-axis thickness of the fourth lens.

As an improvement, the object side surface of the fifth lens is convex in a paraxial region and the image side surface of the fifth lens is convex in the paraxial region. The camera optical lens further satisfies the following conditions: $0.60 \leqslant f5/f \leqslant 2.22$, $-1.26 \leqslant (R9+R10)/(R9-R10) \leqslant -0.21$ and $0.06 \leqslant d9/TTL \leqslant 0.19$, f5 denotes a focal length of the fifth lens, R9 denotes a central curvature radius of an object side surface of the fifth lens, R10 denotes a central curvature radius of an image side surface of the fifth lens, and d9 denotes an on-axis thickness of the fifth lens.

As an improvement, the first lens is made from glass material, and the third lens is made from glass material.

As an improvement, the camera optical lens further satisfies the following condition: $FOV \geqslant 190.00°$, FOV denotes a field of view of the camera optical lens in a diagonal direction.

As an improvement, the camera optical lens further satisfies following condition: $TTL/IH \leqslant 7.15$, IH denotes an image height of the camera optical lens.

The present disclosure is advantageous in follows.

According to the present disclosure, the camera optical lens is provided, which is suitable for a front camera using imaging elements such as CCD or CMOS for high pixel, etc., and which has excellent optical performance with large aperture, long focal length and low distortion.

BRIEF DESCRIPTION OF DRAWINGS

In order to explain the technical solutions in the embodiments of the present invention more clearly, the following will briefly introduce the drawings that need to be used in the description of the embodiments. Obviously, the drawings in the following description are only some embodiments of the present invention. For those of ordinary skill in the art, without creative work, other drawings can be obtained based on these drawings, among which.

DETAILED DESCRIPTION OF EMBODIMENTS

In order to make the objects, technical solutions, and advantages of the present invention more apparent, the embodiments of the present invention will be described in detail below. However, it will be apparent to the one skilled in the art that, in the various embodiments of the present invention, a number of technical details are presented in order to provide the reader with a better understanding of the invention. However, the technical solutions claimed in the present invention can be implemented without these technical details and various changes and modifications based on the following embodiments.

Embodiment 1

Figure 1:
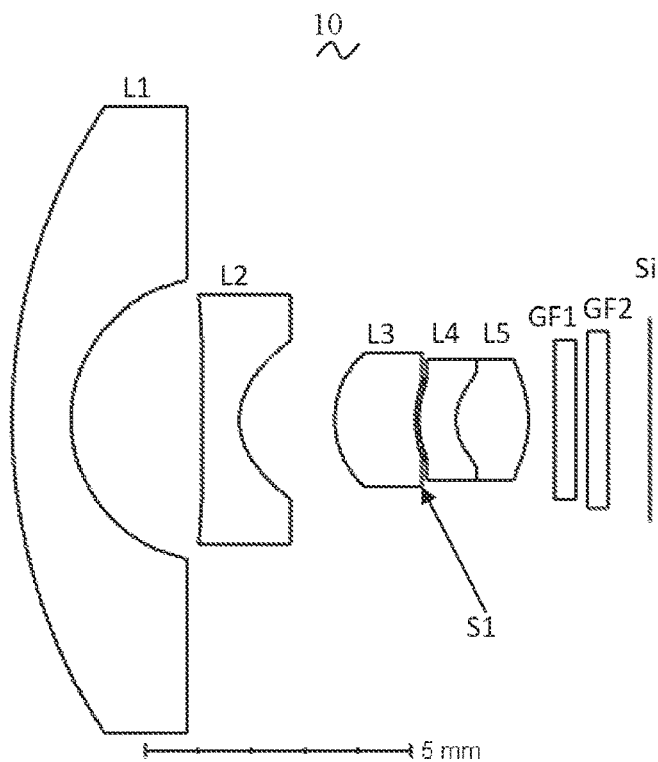
FIG. 1 is a schematic diagram of a structure of a camera optical lens in accordance with Embodiment 1 of the present invention.

As referring to the accompanying drawings, the present invention provides a camera optical lens 10. FIG. 1 shows the camera optical lens 10 according to Embodiment 1 of the present invention. The camera optical lens 10 comprises five lenses. Specifically, from an object side to an image side, the camera optical lens 10 comprises in sequence: an aperture S1, a first lens L1, a second lens L2, a third lens L3, a fourth lens L4 and a fifth lens L5. Optical elements like optical filter GF can be arranged between the fifth lens L5 and an image surface S1. In this embodiment, two filters are included: GF1, GF2.

The first lens L1 is made of glass material, the second lens L2 is made of plastic material, the third lens L3 is made of glass material, the fourth lens L4 is made of plastic material and the fifth lens L5 is made of plastic material. Proper selection of glass lenses can improve the optical performance of camera optical lens. In other optional embodiments, each lens may also be made of other materials.

Object-side surfaces and image-side surfaces of the first lens L1 and the third lens L3 are spherical, and the rest of the lenses are all aspherical lenses. Designing the surfaces of some of the lenses to be spherical can reduce manufacturing difficulty.

A focal length of the camera optical lens 10 is defined as f, and a total optical length of the camera optical lens 10 is defined as TTL. The camera optical lens 10 further satisfies the following condition: $12.00 \leq TTL/f \leq 15.00$, which specifies a ratio of the total optical length TTL of the camera optical lens 10 and the focal length f of the camera optical lens 10. When the value is within this range, it benefits for realizing the ultra-thin effect.

A combined focal length of the fourth lens L4 and the fifth lens L5 is defined as f45, and the fourth lens L4 and the fifth lens L5 are cemented and connected. The camera optical lens 10 further satisfies the following condition: $2.00 \leq f45/f \leq 6.00$, which specifies a ratio of the combined focal length f45 of the fourth lens L4 and the fifth lens L5 and the focal length f of the camera optical lens 10. Through the reasonable distribution of focal length, the camera optical lens has better imaging quality and lower sensitivity.

A central curvature radius of the object side surface of the second lens L2 is defined as R3, and a central curvature radius of the image side surface of the second lens L2 is defined as R4. The camera optical lens 10 further satisfies the following condition: $0 \leq (R3+R4)/(R3-R4) \leq 1.00$, which specifies a shape of the second lens L2. When the value is within this range, it can reduce a deflection of light and effectively correct a chromatism, so that the chromatism $|LC|\leq 10$ μm.

An on-axis distance from an image side surface of the second lens to an object side surface of the third lens is defined as d4, an on-axis distance from an image side surface of the third lens to an object side surface of the fourth lens is defined as d6. The camera optical lens 10 further satisfies the following condition: $8.00\leq d4/d6\leq 30.00$, which specifies a ratio of the on-axis distance between the second lens and the third lens and the on-axis distance between the third lens and the fifth lens. When the value is within this range, it is helpful to compress the total length of the camera optical lens and realize the ultra-thin effect.

A central curvature radius of an object side surface of the fourth lens is defined as R7, and a central curvature radius of an image side surface of the fourth lens is defined as R8. The camera optical lens 10 further satisfies the following condition: $1.50\leq R7/R8\leq 8.00$, a shape of the fourth lens L4. When the value is within this range, it is beneficial for correcting astigmatism and distortion of the camera optical lens, so that $|Distortion|\leq 35.0\%$, and brightness or saturation can be maintained.

In the present embodiment, an object side surface of the first lens L1 is convex in a paraxial region, an image side surface of the first lens L1 is concave in the paraxial region and the first lens L1 has a negative refractive power. In other optional embodiments, the object side surface and the image side surface of the first lens L1 can also be set to other concave and convex distribution situations.

A focal length of the first lens L1 is defined as f1. The camera optical lens 10 further satisfies the following condition: $-12.74\leq f1/f\leq -3.46$, which specifies a ratio of the focal length f1 of the first lens L1 to the focal length f of the camera optical lens 10. When the value is within this range, it is helpful to realize ultra wide angle. Preferably, the following condition shall be satisfied, $-7.97\leq f1/f\leq -4.33$.

A central curvature radius of an object side surface of the first lens L1 is defined as R1, and a central curvature radius of an image side surface of the first lens L1 is defined as R2. The camera optical lens 10 further satisfies the following condition: $0.78\leq (R1+R2)/(R1-R2)\leq 2.77$, when the value is within this range, it is helpful to realize ultra wide angle. Preferably, the following condition shall be satisfied, $1.25\leq (R1+R2)/(R1-R2)\leq 2.22$.

A total optical length from the object side surface of the first lens L1 to the image surface S1 of the camera optical lens 10 along an optical axis is defined as TTL. An on-axis thickness of the first lens L1 is defined as d1. The camera optical lens 10 further satisfies the following condition: $0.04\leq d1/TTL\leq 0.14$, which specifies a ratio of the on-axis thickness of the first lens L1 to the total optical length of the camera optical lens 10. When the value is within this range, it benefits for realizing the ultra wide angle. Preferably, the following condition shall be satisfied, $0.06\leq d1/TTL\leq 0.11$.

In the present embodiment, the object side surface of the second lens L2 is convave in the paraxial region, the image side surface of the second lens L2 is concave in the paraxial region, and the second lens L2 has a negative refractive power. In other optional embodiments, the object side surface and the image side surface of the second lens L2 can also be set to other concave and convex distribution situations.

The focal length of the camera optical lens 10 is defined as f, and a focal length of the second lens L2 is defined as f2. The camera optical lens 10 further satisfies the following condition: $-6.08\leq f2/f\leq -1.43$, which specifies a ratio of the focal length f2 of the second lens L2 to the focal length f of the camera optical lens 10. When the value is within this range, it can effectively balance the field curvature of the optical system. Preferably, the following condition shall be satisfied, $-3.80\leq f2/f\leq -1.78$.

An on-axis thickness of the second lens L2 is defined as d3. The total optical length from the object side surface of the first lens L1 to the image surface S1 of the camera optical lens 10 along the optical axis is defined as TTL. The camera optical lens 10 further satisfies the following condition: $0.03\leq d3/TTL\leq 0.12$. When the value is within this range, it benefits for realizing the ultra-thin effect. Preferably, the following condition shall be satisfied, $0.05\leq d3/TTL\leq 0.10$.

In the present embodiment, the object side surface of the third lens L3 is convex in the paraxial region, the image side surface of the third lens L3 is concave in the paraxial region and the third lens L3 has a positive refractive power. In other optional embodiments, the object side surface and the image side surface of the third lens L3 can also be set to other concave and convex distribution situations.

The focal length of the camera optical lens 10 is defined as f, and a focal length of the third lens L3 is defined as f3. The camera optical lens 10 further satisfies the following condition: $1.50\leq f3/f\leq 6.64$, which specifies a ratio of the focal length of the third lens L3 to the focal length of the camera optical lens 10. Through the reasonable distribution of optical power, the system has better imaging quality and lower sensitivity. Preferably, the following condition shall be satisfied, $2.40\leq f3/f\leq 0.31$.

The central curvature radius of the object side surface of the third lens L3 is defined as R5, and the central curvature radius of the image side surface of the third lens L3 is defined as R6. The camera optical lens 10 further satisfies the following condition: $-15.66\leq (R5+R6)/(R5-R6)\leq 0.21$, which specifies a shape of the third lens L3. When the value is within this range, a degree of deflection of light passing through the lens can be alleviated, and the aberration can be reduced effectively. Preferably, the following condition shall be satisfied, $-9.78\leq (R5+R6)/(R5-R6)\leq 0.17$.

An on-axis thickness of the third lens L3 is defined as d5. The total optical length from the object side surface of the first lens L1 to the image surface S1 of the camera optical lens 10 along the optical axis is defined as TTL. The camera optical lens 10 further satisfies the following condition: $0.05\leq d5/TTL\leq 0.32$, which benefits for realizing the miniaturization effect. Preferably, the following condition shall be satisfied, $0.08\leq d5/TTL\leq 0.26$.

In the present embodiment, the object side surface of the fourth lens L4 is convex in the paraxial region, the image side surface of the fourth lens L4 is concave in the paraxial region and the fourth lens L4 has a negative refractive power. In other optional embodiments, the object side surface and the image side surface of the fourth lens L4 can also be set to other concave and convex distribution situations.

The focal length of the camera optical lens 10 is defined as f, and a focal length of the fourth lens L4 is defined as f4. The camera optical lens 10 further satisfies the following condition: $-19.86\leq f4/f\leq 0.91$. By a reasonable distribution of the refractive power, which makes it is possible that the camera optical lens 10 has an excellent imaging quality and a lower sensitivity. Preferably, the following condition shall be satisfied, $-12.41\leq f4/f\leq -1.13$.

An on-axis thickness of the fourth lens L4 is defined as d7. The total optical length from the object side surface of the first lens L1 to the image surface S1 of the camera optical lens 10 along the optical axis is defined as TTL. The camera optical lens 10 further satisfies the following condition: 0.03

≤ d7/TTL ≤ 0.10, which benefits for realizing the miniaturization effect. Preferably, the following condition shall be satisfied, 0.05≤d7/TTL≤0.08.

In the present embodiment, the object side surface of the fifth lens L5 is convex in the paraxial region, the image side surface of the fifth lens L5 is convex in the paraxial region and the fifth lens L5 has a positive refractive power. In other optional embodiments, the object side surface and the image side surface of the fifth lens L5 can also be set to other concave and convex distribution situations.

The focal length of the camera optical lens 10 is defined as f, and a focal length of the fifth lens L5 is defined as f5. The camera optical lens 10 further satisfies the following condition: 0.60≤ f5/f ≤ 2.22, a light angle of the camera optical lens 10 can be smoothed effectively and the sensitivity of the tolerance can be reduced. Preferably, the following condition shall be satisfied, 0.96≤f5/f≤1.78.

The central curvature radius of the object side surface of the fifth lens L5 is defined as R9, and the central curvature radius of the image side surface of the fifth lens L5 is defined as R10. The camera optical lens further satisfies the following condition: −1.26≤ (R9+R10)/(R9−R10) ≤ −0.21, which specifies a shape of the fifth lens L5. When the value is within this range, as the development of the ultra-thin and telephoto lenses, it benefits for solving the problems such as correcting the off-axis aberration. Preferably, the following condition shall be satisfied, −0.79≤(R9+R10)/(R9−R10)≤−0.26.

An on-axis thickness of the fifth lens L5 is defined as d9. The total optical length from the object side surface of the first lens L1 to the image surface S1 of the camera optical lens 10 along the optical axis is defined as TTL. The camera optical lens 10 further satisfies the following condition: 0.06 ≤ d9/TTL ≤ 0.19. When the value is within this range, it benefits for realizing the miniaturization effect. Preferably, the following condition shall be satisfied, 0.09≤d9/TTL≤0.15.

In the present embodiment, a field of view of the camera optical lens 10 in a diagonal direction is defined as FOV. The FOV is greater than or equal to 190.00°, thereby achieving the wide-angle performance. Preferably, the FOV is greater than or equal to 192.00°.

In the present embodiment, an image height of the camera optical lens 10 is defined as IH. The total optical length from the object side surface of the first lens L1 to the image surface S1 of the camera optical lens 10 along an optical axis is defined as TTL. The camera optical lens 10 further satisfies the following condition: TTL/IH≤7.15, thereby achieving the miniaturization performance. Preferably, the following condition shall be satisfied, TTL/IH≤6.95.

In the present embodiment, an F number (FNO) of the camera optical lens 10 is smaller than or equal to 2.13, thereby achieving a large aperture and good imaging performance. Preferably, the FNO of the camera optical lens 10 is smaller than or equal to 2.10.

When satisfying above conditions, which makes it is possible that the camera optical lens has excellent optical performances, and meanwhile can meet design requirements of the ultra-thin, wide-angle lenses having large aperture.

According the characteristics of the camera optical lens 10, it is particularly suitable for a mobile camera lens component and a WEB camera lens composed of high pixel CCD, CMOS.

The following examples will be used to describe the camera optical lens 10 of the present invention. The symbols recorded in each example will be described as follows. The focal length, on-axis distance, central curvature radius, on-axis thickness, inflection point position, and stationary point position are all in units of mm.

TTL: the total optical length from the object side surface of the first lens L1 to the image surface S1 of the camera optical lens 10 along the optical axis, the unit of TTL is mm.

F number (FNO): the ratio of an effective focal length of the camera optical lens 10 to an entrance pupil diameter (ENPD).

Preferably, inflection points and/or stationary points can also be arranged on the object side surface and/or image side surface of the lens, so that the demand for high quality imaging can be satisfied, the description below can be referred for specific implementable scheme.

The design information of the camera optical lens 10 in Embodiment 1 of the present invention is shown in the tables 1 and 2.

TABLE 1

|     | R        |       | d      | nd     |     | vd    |
|-----|----------|-------|--------|--------|-----|-------|
| S1  | ∞        | d0=   | −7.742 |        |     |       |
| R1  | 10.915   | d1=   | 1.107  | nd1    | v1  | 49.08 |
| R2  | 2.673    | d2=   | 2.456  |        |     |       |
| R3  | −243.710 | d3=   | 0.700  | nd2    | v2  | 55.90 |
| R4  | 1.225    | d4=   | 1.795  |        |     |       |
| R5  | 1.700    | d5=   | 1.516  | nd3    | v3  | 26.66 |
| R6  | 2.198    | d6=   | 0.060  |        |     |       |
| R7  | 1.549    | d7=   | 0.700  | nd4    | v4  | 76.27 |
| R8  | 1.028    | d8=   | 0.000  |        |     |       |
| R9  | 1.028    | d9=   | 1.363  | nd5    | v5  | 55.90 |
| R10 | −1.969   | d10=  | 0.500  |        |     |       |
| R11 | ∞        | d11=  | 0.400  | ndg1   | vg1 | 54.52 |
| R12 | ∞        | d12=  | 0.200  |        |     |       |
| R13 | ∞        | d13=  | 0.400  | ndg2   | vg2 | 64.17 |
| R14 | ∞        | d14=  | 0.773  |        |     |       |

Where, the meaning of the various symbols is as follows.

S1: aperture;

R: curvature radius of an optical surface, a central curvature radius for a lens;

R1: central curvature radius of the object side surface of the first lens L1;

R2: central curvature radius of the image side surface of the first lens L1;

R3: central curvature radius of the object side surface of the second lens L2;

R4: central curvature radius of the image side surface of the second lens L2;

R5: central curvature radius of the object side surface of the third lens L3;

R6: central curvature radius of the image side surface of the third lens L3;

R7: central curvature radius of the object side surface of the fourth lens L4;

R8: central curvature radius of the image side surface of the fourth lens L4;

R9: central curvature radius of the object side surface of the fifth lens L5;

R10: central curvature radius of the image side surface of the fifth lens L5;

R11: central curvature radius of an object side surface of the optical filter GF1;

R12: central curvature radius of an image side surface of the optical filter GF1;

R11: central curvature radius of an object side surface of the optical filter GF2;

R12: central curvature radius of an image side surface of the optical filter GF2;

d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the optical filter GF1;
d11: on-axis thickness of the optical filter GF1;
d12: on-axis distance from the image side surface of the optical filter GF1 to the optical filter GF2;
d13: on-axis thickness of the optical filter GF2;
d14: on-axis distance from the image side surface of the optical filter GF2 to the image surface;
nd: refractive index of d line (d-line is green light with a wavelength of 550 nm);
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
ndg1: refractive index of d line of the optical filter GF1;
ndg2: refractive index of d line of the optical filter GF2;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
vg1: abbe number of the optical filter GF1;
vg2: abbe number of the optical filter GF2;

Table 2 shows the aspheric data of the camera optical lens 10 in Embodiment 1 of the present invention.

TABLE 2

|  | Conic coefficient | Aspheric coefficients | | | | |
| --- | --- | --- | --- | --- | --- | --- |
|  | k | A4 | A6 | A8 | A10 | A12 |
| R3 | 9.0000E+01 | 7.4225E−03 | −5.0567E−03 | 5.3425E−04 | 1.9863E−04 | −5.9518E−05 |
| R4 | −8.3469E−01 | 4.5627E−02 | −1.2312E−01 | 2.3638E−01 | −2.8092E−01 | 1.7973E−01 |
| R7 | 6.1592E−01 | −1.1332E−01 | 5.9641E−02 | −3.8632E−01 | 3.8441E−01 | −1.5125E−01 |
| R8 | −8.8024E+00 | 1.0039E+00 | −1.6537E+00 | 1.5821E+00 | −1.3035E+00 | 9.6251E−01 |
| R9 | −8.8024E+00 | 1.0039E+00 | −1.6537E+00 | 1.5821E+00 | −1.3035E+00 | 9.6251E−01 |
| R10 | −3.2815E−01 | 4.2514E−02 | −6.0786E−02 | 1.2775E−01 | −1.5381E−01 | 1.0371E−01 |

|  | Conic coefficient | Aspheric coefficients | |
| --- | --- | --- | --- |
|  | k | A14 | A16 |
| R3 | 9.0000E+01 | 6.0128E−06 | −2.3539E−07 |
| R4 | −8.3469E−01 | −5.7018E−02 | 7.0433E−03 |
| R7 | 6.1592E−01 | 5.7395E−02 | −8.3677E−03 |
| R8 | −8.8024E+00 | −6.0045E−01 | 1.3520E−01 |
| R9 | −8.8024E+00 | −6.0045E−01 | 1.3520E−01 |
| R10 | −3.2815E−01 | −2.8589E−02 | 3.1232E−03 |

For convenience, an aspheric surface of each lens surface uses the aspheric surfaces shown in the below condition (1). However, the present invention is not limited to the aspheric polynomials form shown in the condition (1).

$$z=(cr^2)/\{1+[1-(k+1)(c^2r^2)]^{1/2}\}+A4r^4+A6r^6+A8r^8+A10r^{10}+A12r^{12}+A14r^{14}+A16r^{16} \quad (1)$$

Where, K is a conic coefficient, A4, A6, A8, A10, A12, A14, A16 are aspheric surface coefficients. c is the curvature at the center of the optical surface. r is a vertical distance between a point on an aspheric curve and the optic axis, and z is an aspheric depth (a vertical distance between a point on an aspheric surface, having a distance of r from the optic axis, and a surface tangent to a vertex of the aspheric surface on the optic axis).

Table 3 and Table 4 show design data of inflection points and stationary points of respective lens in the camera optical lens 10 according to Embodiment 1 of the present invention. P1R1 and P1R2 represent the object side surface and the image side surface of the first lens L1, P2R1 and P2R2 represent the object side surface and the image side surface of the second lens L2, P3R1 and P3R2 represent the object side surface and the image side surface of the third lens L3, P4R1 and P4R2 represent the object side surface and the image side surface of the fourth lens L4, and P5R1 and P5R2 represent the object side surface and the image side surface of the fifth lens L5. The data in the column named "inflection point position" refers to vertical distances from inflection points arranged on each lens surface to the optical axis of the camera optical lens 10. The data in the column named "stationary point position" refers to vertical distances from stationary points arranged on each lens surface to the optical axis of the camera optical lens 10.

TABLE 3

|  | Number of inflection points | Inflection point position 1 | Inflection point position 2 |
|---|---|---|---|
| P1R1 | 0 | / | / |
| P1R2 | 0 | / | / |
| P2R1 | 2 | 0.225 | 0.815 |
| P2R2 | 0 | / | / |
| P3R1 | 0 | / | / |
| P3R2 | 0 | / | / |
| P4R1 | 1 | 0.685 | / |
| P4R2 | 1 | 0.705 | / |
| P5R1 | 1 | 0.705 | / |
| P5R2 | 1 | 0.925 | / |

TABLE 4

|  | Number of stationary points | Stationary point position 1 | Stationary point position 2 |
|---|---|---|---|
| P1R1 | 0 | / | / |
| P1R2 | 0 | / | / |
| P2R1 | 2 | 0.405 | 1.035 |
| P2R2 | 0 | / | / |
| P3R1 | 0 | / | / |
| P3R2 | 0 | / | / |
| P4R1 | 0 | / | / |
| P4R2 | 1 | 0.945 | / |
| P5R1 | 1 | 0.945 | / |
| P5R2 | 0 | / | / |

Figure 2:
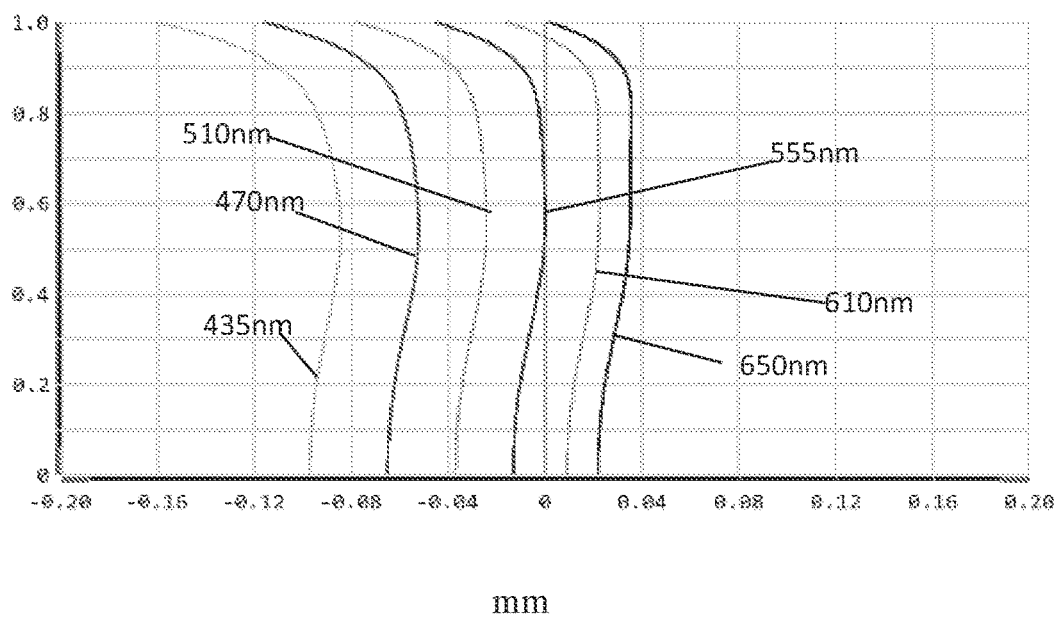
FIG. 2 is a schematic diagram of a longitudinal aberration of the camera optical lens shown in FIG. 1.
Figure 3:
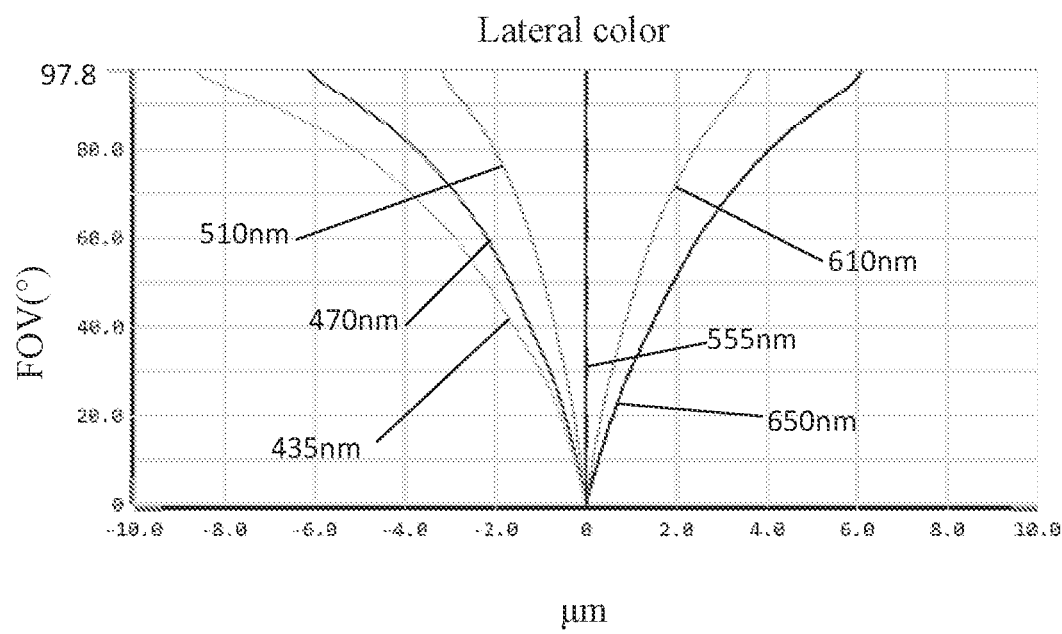
FIG. 3 is a schematic diagram of a lateral color of the camera optical lens shown in FIG. 1.
Figure 4:
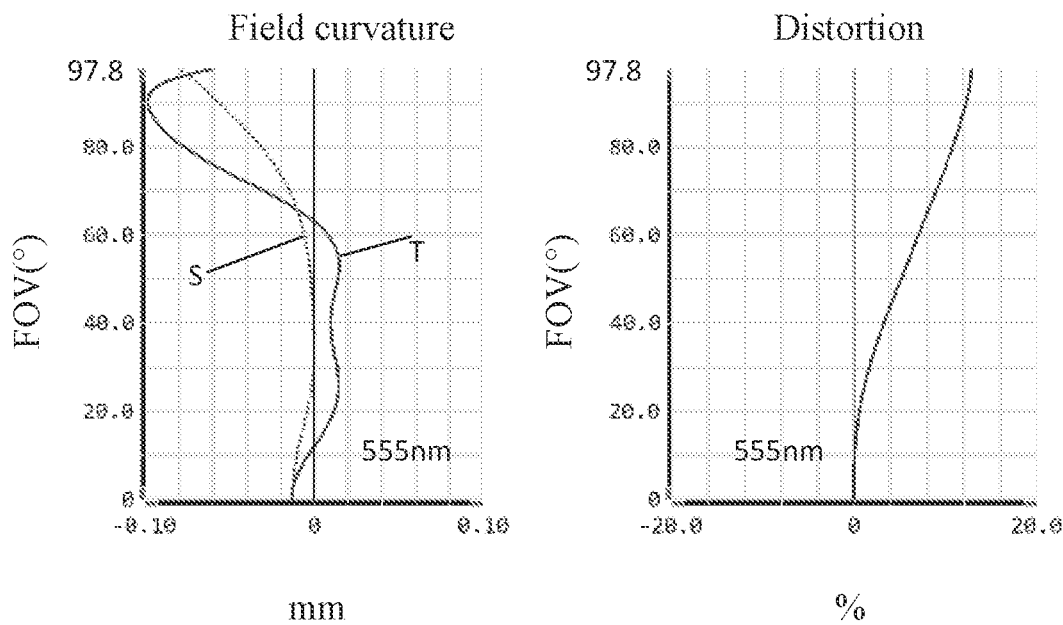
FIG. 4 is a schematic diagram of a field curvature and a distortion of the camera optical lens shown in FIG. 1.

FIG. 2 and FIG. 3 respectively illustrate a longitudinal aberration and a lateral color of light with wavelengths of 650 nm, 610 nm, 555 nm, 510 nm, 470 nm and 435 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a tangential direction.

Table 33 in the following lists values corresponding to the respective conditions. Obviously, the camera optical lens 10 of the present embodiment satisfies the above-mentioned conditions. As shown in Table 33, Embodiment 1 satisfies the above conditions.

In the present embodiment, the entrance pupil diameter (ENPD) of the camera optical lens 10 is 0.497 mm. The image height of 1.0H is 1.92 mm. The FOV is 195.60°. Thus, the camera optical lens 10 satisfies design requirements of large aperture, ultra-thin and ultra-wide-angle while the on-axis and off-axis aberrations are sufficiently corrected, thereby achieving excellent optical characteristics.

Embodiment 2

Embodiment 2 is basically the same as Embodiment 1, the meaning of its symbols is the same as that of Embodiment 1, in the following, only the differences are listed.

In this embodiment, an image side surface of a third lens L3 is convex in a paraxial region.

Figure 5:
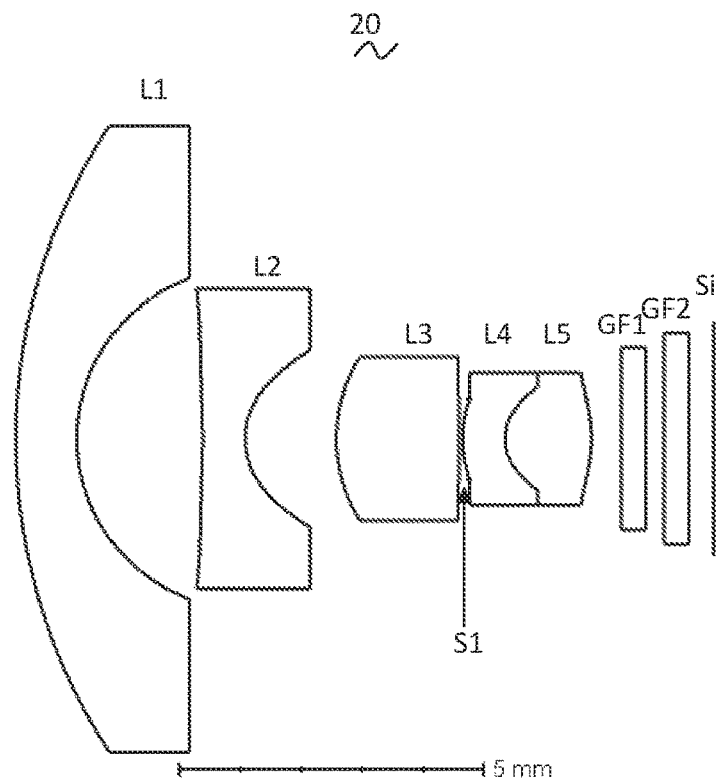
FIG. 5 is a schematic diagram of a structure of a camera optical lens in accordance with Embodiment 2 of the present invention.

FIG. 5 shows a schematic diagram of a structure of a camera optical lens 20 according to Embodiment 2 of the present invention. Table 5 and table 6 show the design data of a camera optical lens 20 in Embodiment 2 of the present invention.

TABLE 5

|  | R | d | nd | vd |
|---|---|---|---|---|
| S1 | ∞ | d0= −7.432 |  |  |
| R1 | 9.402 | d1= 1.000 | nd1 1.8557 | v1 41.94 |
| R2 | 2.799 | d2= 2.060 |  |  |
| R3 | −10.920 | d3= 0.700 | nd2 1.5440 | v2 55.90 |
| R4 | 1.213 | d4= 1.500 |  |  |
| R5 | 2.526 | d5= 2.010 | nd3 1.7913 | v3 24.60 |
| R6 | −35.060 | d6= 0.060 |  |  |
| R7 | 1.958 | d7= 0.700 | nd4 1.6613 | v4 76.27 |
| R8 | 0.771 | d8= 0.000 |  |  |
| R9 | 0.771 | d9= 1.417 | nd5 1.5440 | v5 55.90 |
| R10 | −2.307 | d10= 0.500 |  |  |
| R11 | ∞ | d11= 0.400 | ndg1 1.5233 | vg1 54.52 |
| R12 | ∞ | d12= 0.300 |  |  |
| R13 | ∞ | d13= 0.400 | ndg2 1.5168 | vg2 64.17 |
| R14 | ∞ | d14= 0.404 |  |  |

Table 6 shows aspheric data of each lens of the camera optical lens 20 in Embodiment 2 of the present invention.

TABLE 6

| | Conic coefficient | Aspheric coefficients | | | | | | |
|---|---|---|---|---|---|---|---|---|
| | k | A4 | A6 | A8 | A10 | A12 | A14 | A16 |
| R3 | −5.3385E+00 | 2.5335E−02 | −7.0095E−03 | 3.2252E−04 | 2.3630E−04 | −5.9518E−05 | 6.0128E−06 | −2.3539E−07 |
| R4 | −4.4212E+00 | 2.9664E−01 | −2.4729E−01 | 2.4551E−01 | −1.8543E−01 | 8.2815E−02 | −1.8832E−02 | 1.6342E−03 |
| R7 | −1.0122E+00 | −1.3115E−02 | 3.5738E−02 | −1.3924E−01 | 2.0801E−01 | −1.5125E−01 | 5.7395E−02 | −8.3677E−03 |
| R8 | −6.9839E−01 | 1.1546E−01 | −3.2478E−01 | 5.9919E−01 | −8.9274E−01 | 9.6251E−01 | −6.0045E−01 | 1.3520E−01 |
| R9 | −6.9839E−01 | 1.1546E−01 | −3.2478E−01 | 5.9919E−01 | −8.9274E−01 | 9.6251E−01 | −6.0045E−01 | 1.3520E−01 |
| R10 | −1.9614E+00 | 4.8855E−02 | −5.0578E−02 | 1.5968E−01 | −1.8588E−01 | 1.0371E−01 | −2.8589E−02 | 3.1232E−03 |

Table 7 and table 8 show design data of inflection points and stationary points of respective lens in the camera optical lens 20 according to Embodiment 2 of the present invention.

TABLE 7

| | Number of inflection points | Inflection point position 1 | Inflection point position 2 |
|---|---|---|---|
| P1R1 | 0 | / | / |
| P1R2 | 0 | / | / |
| P2R1 | 2 | 0.635 | 1.335 |
| P2R2 | 0 | / | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 1 | 0.745 | / |

TABLE 8

| | Number of stationary points |
|---|---|
| Embodiment 2 | 0 |

Figure 6:
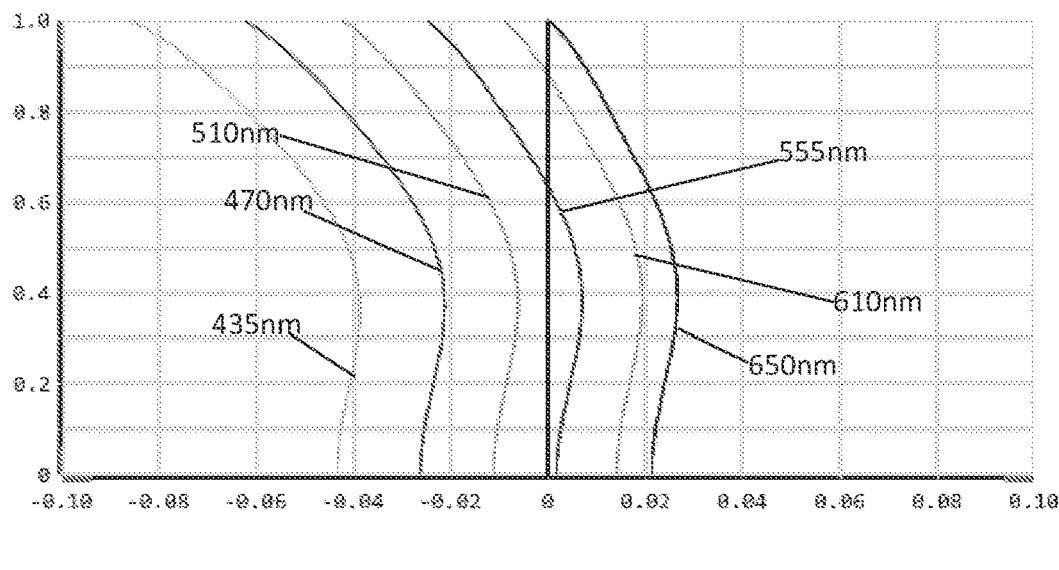
FIG. 6 is a schematic diagram of a longitudinal aberration of the camera optical lens shown in FIG. 5.
Figure 7:
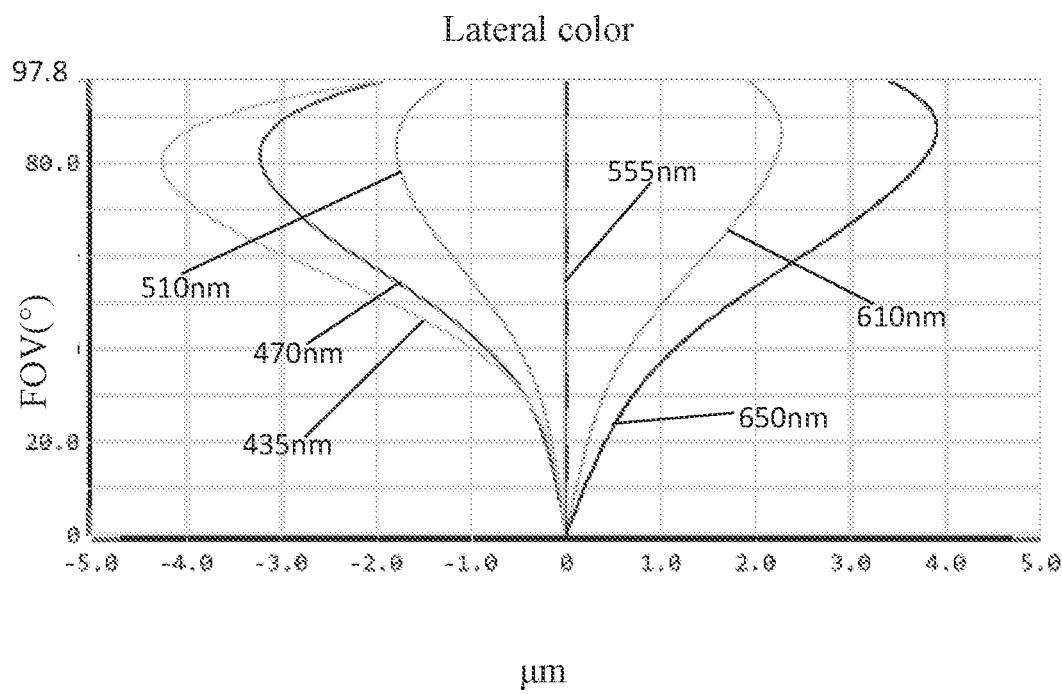
FIG. 7 is a schematic diagram of a lateral color of the camera optical lens shown in FIG. 5.
Figure 8:
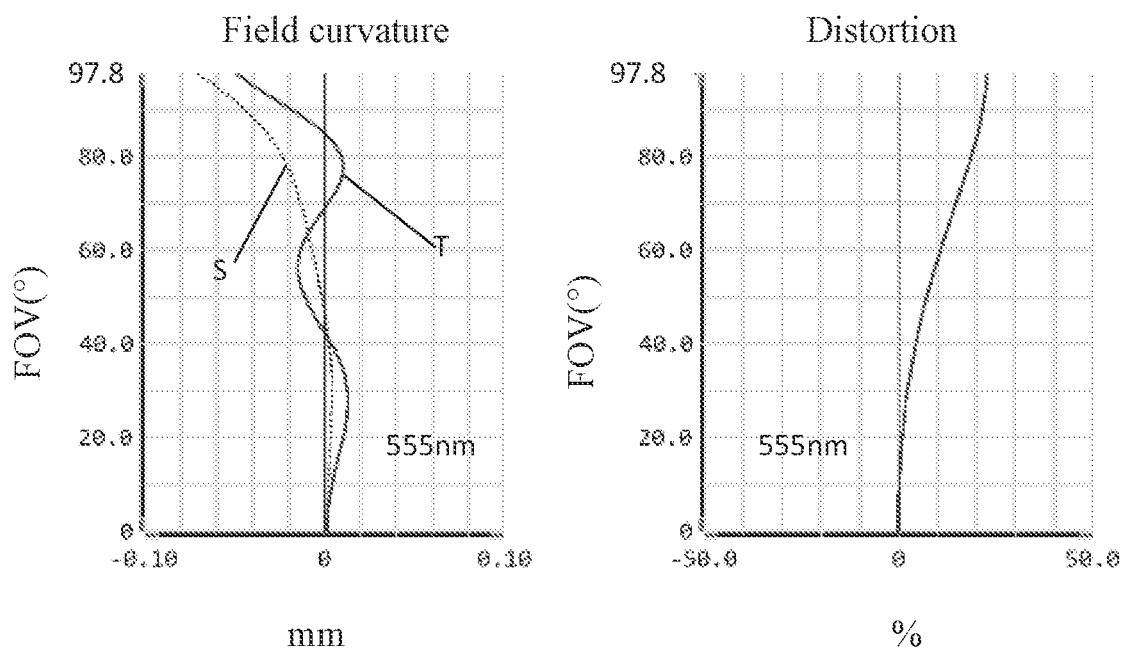
FIG. 8 is a schematic diagram of a field curvature and a distortion of the camera optical lens shown in FIG. 5.

FIG. 6 and FIG. 7 respectively illustrate a longitudinal aberration and a lateral color of light with wavelengths of 650 nm, 610 nm, 555 nm, 510 nm, 470 nm and 435 nm after passing the camera optical lens 20 according to Embodiment 2. FIG. 8 illustrates a field curvature and a distortion of light with a wavelength of 555 nm after passing the camera optical lens 10 according to Embodiment 2, in which a field curvature S is a field curvature in a sagittal direction and T is a field curvature in a tangential direction.

Table 33 in the following lists values corresponding to the respective conditions. Obviously, the camera optical lens 20 of the present embodiment satisfies the above-mentioned conditions.

In the present embodiment, an entrance pupil diameter (ENPD) of the camera optical lens is 0.447 mm. An image height of 1.0H is 1.920 mm. Diagonal FOV is 195.60°. Thus, the camera optical lens 20 satisfies design requirements of large aperture, ultra-thin and ultra-wide-angle while the on-axis and off-axis aberrations are sufficiently corrected, thereby achieving excellent optical characteristics.

Embodiment 3

Embodiment 3 is basically the same as Embodiment 1 and involves symbols having the same meanings as Embodiment 1, and only differences will be described in the following.

In this embodiment, an image-side surface of a third lens L3 is convex in a paraxial region.

Figure 9:
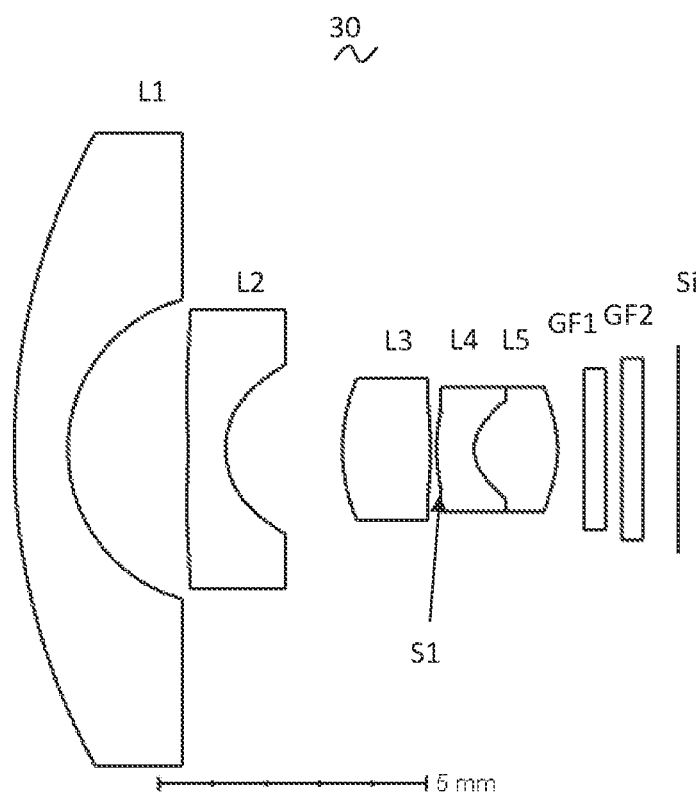
FIG. 9 is a schematic diagram of a structure of a camera optical lens in accordance with Embodiment 3 of the present invention.

FIG. 9 shows a schematic diagram of a structure of a camera optical lens 30 according to Embodiment 3 of the present invention. Table 9 and table 10 show the design data of the camera optical lens 30 in Embodiment 3 of the present invention.

TABLE 9

| | R | d | | nd | | vd |
|---|---|---|---|---|---|---|
| S1 | ∞ | d0= | −7.965 | | | |
| R1 | 12.342 | d1= | 1.000 | nd1 | 1.6886 v1 | 52.10 |
| R2 | 2.905 | d2= | 2.252 | | | |
| R3 | −6.921 | d3= | 0.700 | nd2 | 1.5440 v2 | 55.90 |
| R4 | 1.731 | d4= | 2.178 | | | |
| R5 | 3.433 | d5= | 1.639 | nd3 | 1.8986 v3 | 21.88 |
| R6 | −9.208 | d6= | 0.121 | | | |
| R7 | 3.223 | d7= | 0.700 | nd4 | 1.6613 v4 | 76.27 |
| R8 | 0.658 | d8= | 0.000 | | | |
| R9 | 0.658 | d9= | 1.561 | nd5 | 1.5440 v5 | 55.90 |
| R10 | −2.137 | d10= | 0.500 | | | |
| R11 | ∞ | d11= | 0.400 | ndg1 | 1.5233 vg1 | 54.52 |
| R12 | ∞ | d12= | 0.300 | | | |
| R13 | ∞ | d13= | 0.400 | ndg2 | 1.5168 vg2 | 64.17 |
| R14 | ∞ | d14= | 0.659 | | | |

Table 10 shows aspheric data of each lens of the camera optical lens 30 in Embodiment 3 of the present invention.

TABLE 10

| | Conic coefficient | Aspheric coefficients | | | | | | |
|---|---|---|---|---|---|---|---|---|
| | k | A4 | A6 | A8 | A10 | A12 | A14 | A16 |
| R3 | −9.0000E+01 | 3.2078E−02 | −8.6737E−03 | 5.0947E−04 | 2.2766E−04 | −5.9518E−05 | 6.0128E−06 | −2.3539E−07 |
| R4 | −3.7431E−02 | 1.1550E−01 | −1.5271E−01 | 2.1083E−01 | −1.8102E−01 | 8.2815E−02 | −1.8832E−02 | 1.6342E−03 |
| R7 | −4.6439E+00 | −3.0140E−02 | 3.5109E−02 | −1.0336E−01 | 1.7430E−01 | −1.5125E−01 | 5.7395E−02 | −8.3677E−03 |
| R8 | −6.8018E−01 | −2.2182E−01 | −1.4676E−01 | 3.8488E−01 | −8.4103E−01 | 9.6251E−01 | −6.0045E−01 | 1.3520E−01 |
| R9 | −6.8018E−01 | −2.2182E−01 | −1.4676E−01 | 3.8488E−01 | −8.4103E−01 | 9.6251E−01 | −6.0045E−01 | 1.3520E−01 |
| R10 | −1.5826E+00 | 3.1419E−02 | −6.3135E−02 | 1.5606E−01 | −1.7839E−01 | 1.0371E−01 | −2.8589E−02 | 3.1232E−03 |

Table 11 and table 12 show Embodiment 3 design data of inflection points and stationary points of respective lens in the camera optical lens 30 according to Embodiment 3 of the present invention.

TABLE 11

| | Number of inflection points | Inflection point position 1 | Inflection point position 2 |
|---|---|---|---|
| P1R1 | 0 | / | / |
| P1R2 | 0 | / | / |
| P2R1 | 2 | 0.505 | 1.735 |
| P2R2 | 1 | 1.565 | / |
| P3R1 | 0 | / | / |
| P3R2 | 0 | / | / |
| P4R1 | 0 | / | / |
| P4R2 | 0 | / | / |
| P5R1 | 0 | / | / |
| P5R2 | 1 | 0.995 | / |

TABLE 12

| | Number of stationary points | Stationary point position 1 | Stationary point position 2 |
|---|---|---|---|
| P2R1 | 2 | 1.025 | 2.505 |

Figure 10:
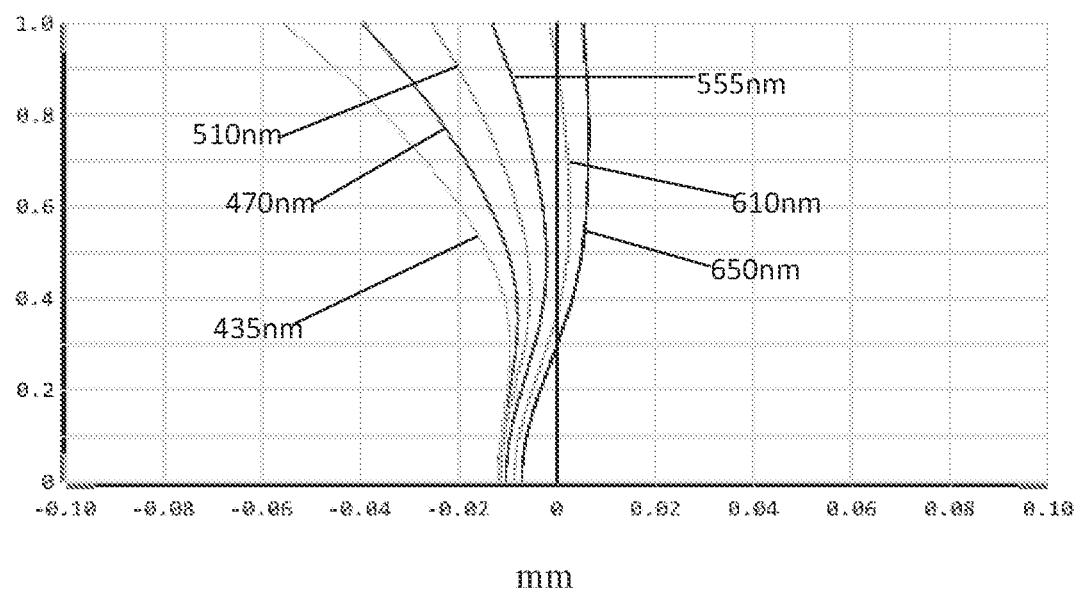
FIG. 10 is a schematic diagram of a longitudinal aberration of the camera optical lens shown in FIG. 9.
Figure 11:
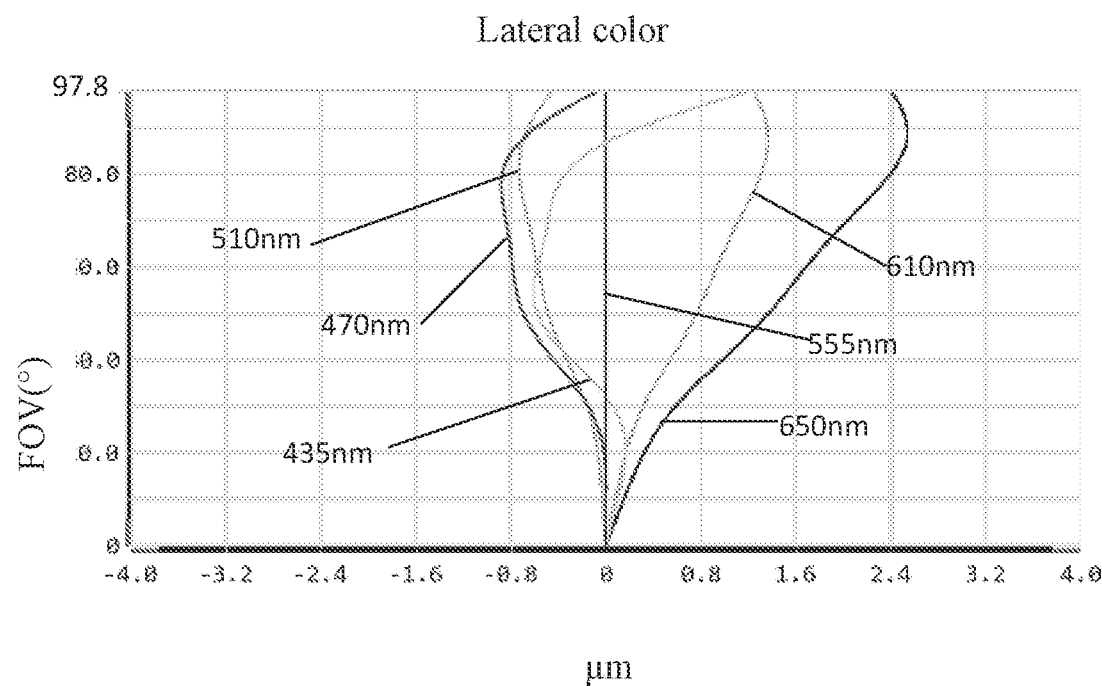
FIG. 11 is a schematic diagram of a lateral color of the camera optical lens shown in FIG. 9.
Figure 12:
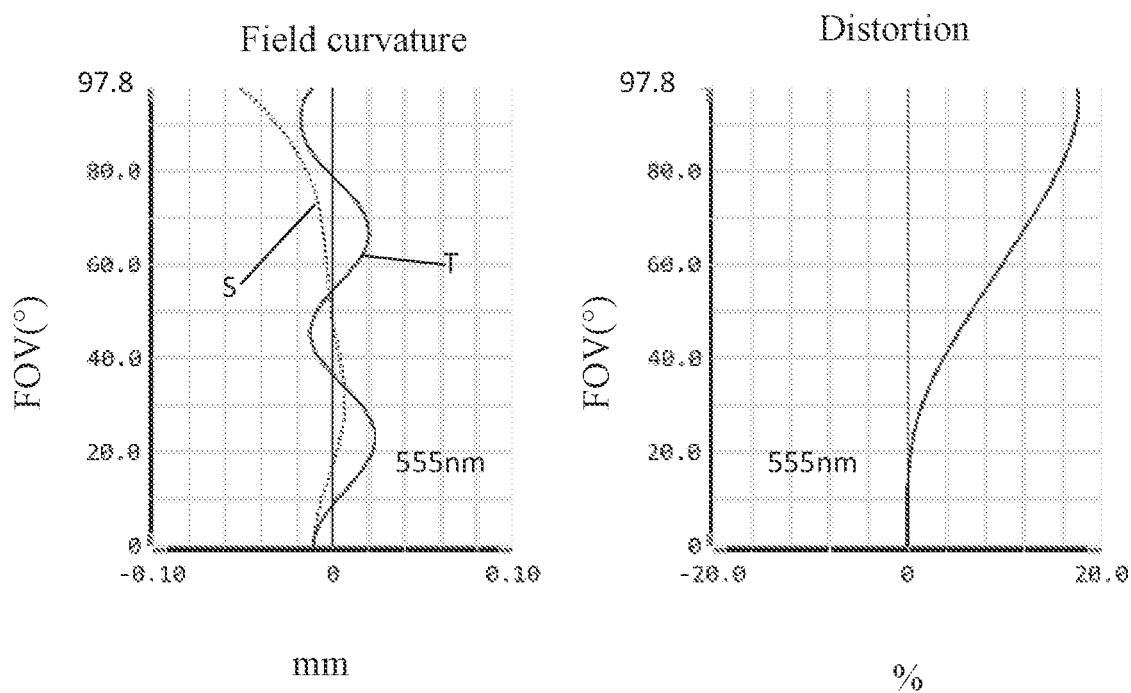
FIG. 12 is a schematic diagram of a field curvature and a distortion of the camera optical lens shown in FIG. 9.

FIG. 10 and FIG. 11 respectively illustrate a longitudinal aberration and a lateral color of light with wavelengths of 650 nm, 610 nm, 555 nm, 510 nm, 470 nm and 435 nm after passing the camera optical lens 30 according to Embodiment 3. FIG. 12 illustrates a field curvature and a distortion of light with a wavelength of 555 nm after passing the camera optical lens 30 according to Embodiment 3, in which a field curvature S is a field curvature in a sagittal direction and T is a field curvature in a tangential direction.

Table 33 in the following lists values corresponding to the respective conditions. Obviously, the camera optical lens 30 of the present embodiment satisfies the above-mentioned conditions.

In the present embodiment, an entrance pupil diameter (ENPD) of the camera optical lens is 0.46 mm. An image height of 1.0H is 1.920 mm. A diagonal FOV is 195.60°. Thus, the camera optical lens 30 satisfies design requirements of large aperture, ultra-thin and ultra-wide-angle while the on-axis and off-axis aberrations are sufficiently corrected, thereby achieving excellent optical characteristics.

Embodiment 4

Embodiment 4 is basically the same as Embodiment 1 and involves symbols having the same meanings as Embodiment 1, and only differences therebetween will be described in the following.

In this embodiment, an image side surface of a third lens L3 is convex in a paraxial region.

Figure 13:
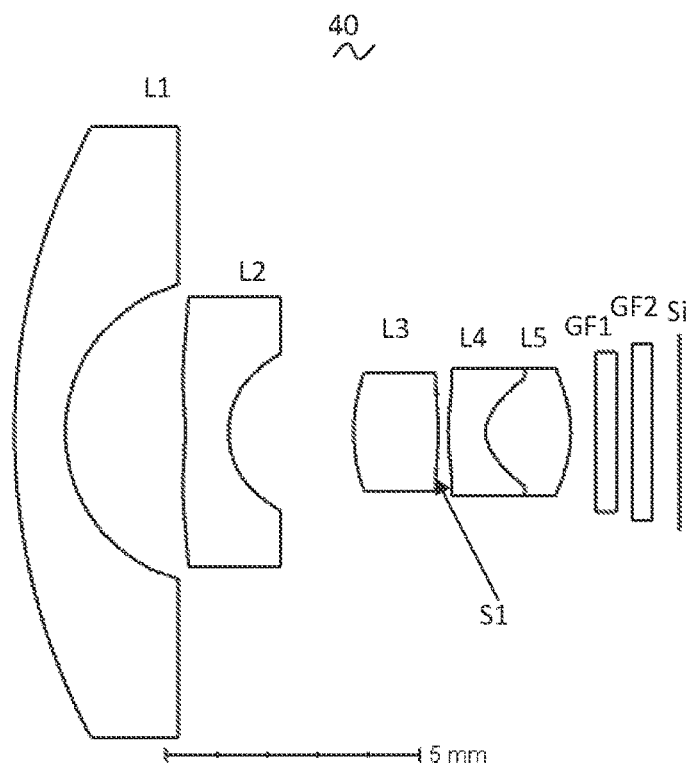
FIG. 13 is a schematic diagram of a structure of a camera optical lens in accordance with Embodiment 4 of the present invention.

FIG. 13 shows a schematic diagram of a structure of a camera optical lens 40 according to Embodiment 4 of the present invention. A third lens L3 has a positive refractive power. The third lens L3 has an object side surface being convex in a paraxial position, and an image side surface being concave in the paraxial position. Tables 13 and 14 show the design data of a camera optical lens 40 in Embodiment 4 of the present invention.

TABLE 13

| | R | d | | nd | | vd |
|---|---|---|---|---|---|---|
| S1 | ∞ | d0= | −8.296 | | | |
| R1 | 12.711 | d1= | 1.000 | nd1 | 1.7175 | v1 | 49.62 |
| R2 | 3.008 | d2= | 2.352 | | | |
| R3 | −4.704 | d3= | 0.861 | nd2 | 1.5440 | v2 | 55.90 |
| R4 | 2.016 | d4= | 2.463 | | | |
| R5 | 3.368 | d5= | 1.656 | nd3 | 1.8887 | v3 | 24.74 |
| R6 | −6.648 | d6= | 0.205 | | | |
| R7 | 4.166 | d7= | 0.733 | nd4 | 1.6613 | v4 | 76.27 |
| R8 | 0.636 | d8= | 0.000 | | | |
| R9 | 0.636 | d9= | 1.681 | nd5 | 1.5440 | v5 | 55.90 |
| R10 | −2.166 | d10= | 0.500 | | | |
| R11 | ∞ | d11= | 0.400 | ndg1 | 1.5233 | vg1 | 54.52 |
| R12 | ∞ | d12= | 0.300 | | | |
| R13 | ∞ | d13= | 0.400 | ndg2 | 1.5168 | vg2 | 64.17 |
| R14 | ∞ | d14= | 0.531 | | | |

Table 14 shows aspheric data of each lens of the camera optical lens 40 in Embodiment 4 of the present invention.

TABLE 14

| | Conic coefficient | Aspheric coefficients | | | | | | |
|---|---|---|---|---|---|---|---|---|
| | k | A4 | A6 | A8 | A10 | A12 | A14 | A16 |
| R3 | −9.0000E+01 | 3.2182E−02 | −8.1052E−03 | 4.0479E−04 | 2.3396E−04 | −5.9518E−05 | 6.0128E−06 | −2.3539E−07 |
| R4 | 3.6190E−01 | 1.5621E−01 | −1.9030E−01 | 2.2794E−01 | −1.8374E−01 | 8.2815E−02 | −1.8832E−02 | 1.6342E−03 |
| R7 | −9.7521E−01 | −5.7188E−02 | 4.9728E−02 | −1.2366E−01 | 1.8877E−01 | −1.5125E−01 | 5.7395E−02 | −8.3677E−03 |
| R8 | −7.4890E−01 | −2.9034E−01 | 6.9228E−02 | 1.2308E−01 | −6.8529E−01 | 9.6251E−01 | −6.0045E−01 | 1.3520E−01 |
| R9 | −7.4890E−01 | −2.9034E−01 | 6.9228E−02 | 1.2308E−01 | −6.8529E−01 | 9.6251E−01 | −6.0045E−01 | 1.3520E−01 |
| R10 | −2.1875E+00 | 3.8298E−02 | −1.0043E−01 | 1.8856E−01 | −1.8975E−01 | 1.0371E−01 | −2.8589E−02 | 3.1232E−03 |

Table 15 and table 16 show Embodiment 4 design data of inflection points and stationary points of respective lens in the camera optical lens 40 according to Embodiment 4 of the present invention.

TABLE 15

| | Number of inflection points | Inflection point position 1 | Inflection point position 2 |
|---|---|---|---|
| P1R1 | 0 | / | / |
| P1R2 | 0 | / | / |
| P2R1 | 2 | 0.495 | 2.035 |
| P2R2 | 0 | / | / |
| P3R1 | 0 | / | / |
| P3R2 | 0 | / | / |
| P4R1 | 1 | 0.695 | / |
| P4R2 | 0 | / | / |
| P5R1 | 0 | / | / |
| P5R2 | 1 | 1.125 | / |

TABLE 16

| | Number of stationary points | Stationary point position 1 | Stationary point position 2 |
|---|---|---|---|
| P2R1 | 2 | 1.065 | 2.665 |

Figure 14:
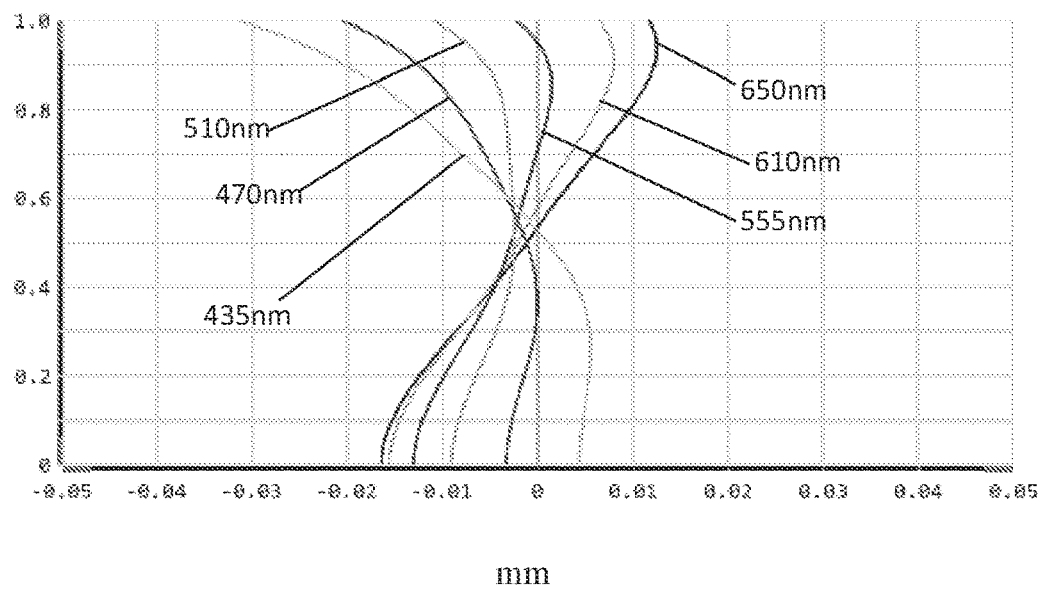
FIG. 14 is a schematic diagram of a longitudinal aberration of the camera optical lens shown in FIG. 13.
Figure 15:
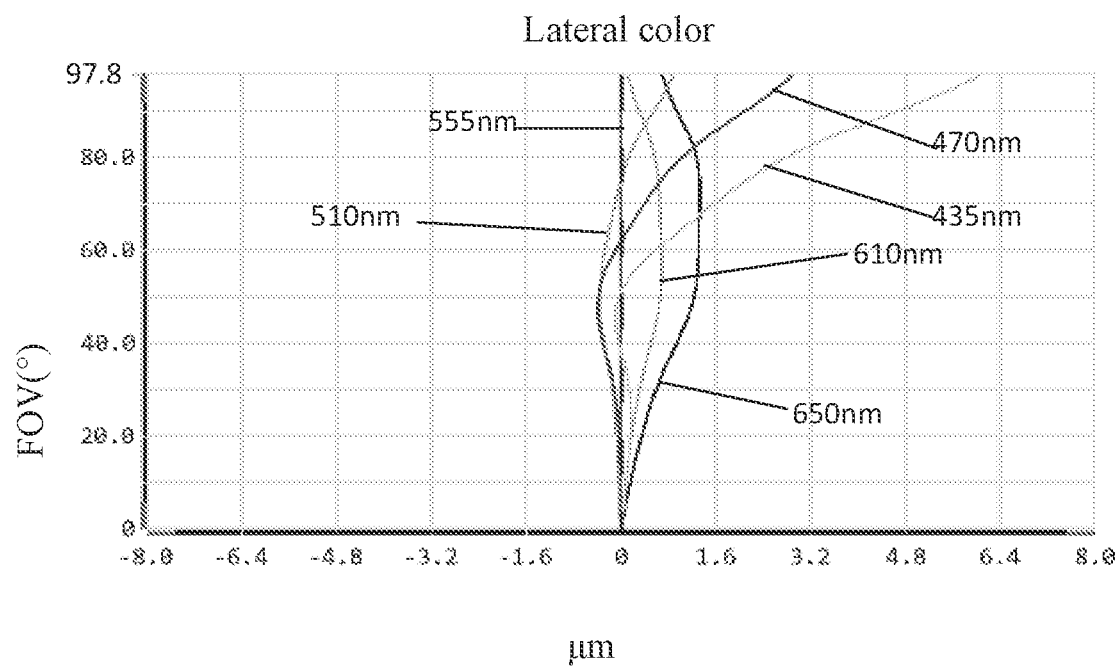
FIG. 15 is a schematic diagram of a lateral color of the camera optical lens shown in FIG. 13.
Figure 16:
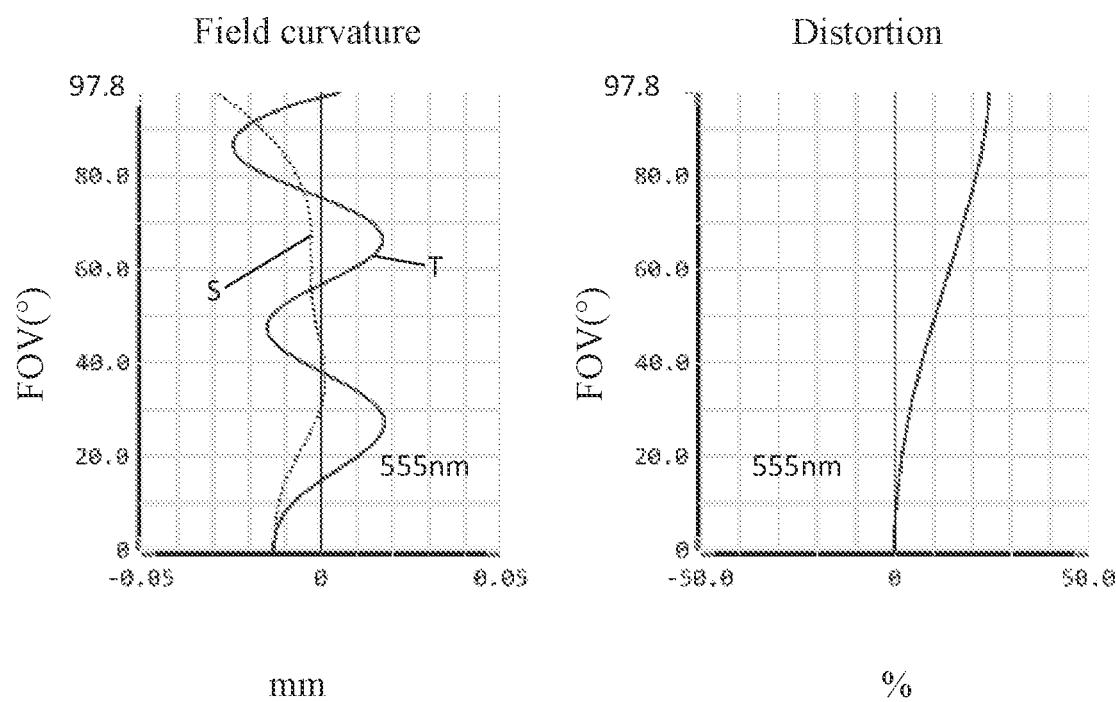
FIG. 16 is a schematic diagram of a field curvature and a distortion of the camera optical lens shown in FIG. 13.

FIG. 14 and FIG. 15 respectively illustrate a longitudinal aberration and a lateral color of light with wavelengths of 650 nm, 610 nm, 555 nm, 510 nm, 470 nm and 435 nm after passing the camera optical lens 30 according to Embodiment 4. FIG. 16 illustrates a field curvature and a distortion of light with a wavelength of 555 nm after passing the camera optical lens 40 according to Embodiment 4, in which a field curvature S is a field curvature in a sagittal direction and T is a field curvature in a tangential direction.

Table 33 in the following lists values corresponding to the respective conditions. Obviously, the camera optical lens 40 of the present embodiment satisfies the above-mentioned conditions.

In the present embodiment, an entrance pupil diameter (ENPD) of the camera optical lens is 0.437 mm. An image height of 1.0H is 1.920 mm. An FOV is 195.60°. Thus, the camera optical lens 40 satisfies design requirements of large aperture, ultra-thin and ultra-wide-angle while the on-axis and off-axis aberrations are sufficiently corrected, thereby achieving excellent optical characteristics.

Embodiment 5

Embodiment 5 is basically the same as Embodiment 1 and involves symbols having the same meanings as Embodiment 1, and only differences therebetween will be described in the following.

An image side surface of a third lens L3 is convex in a paraxial region.

Figure 17:
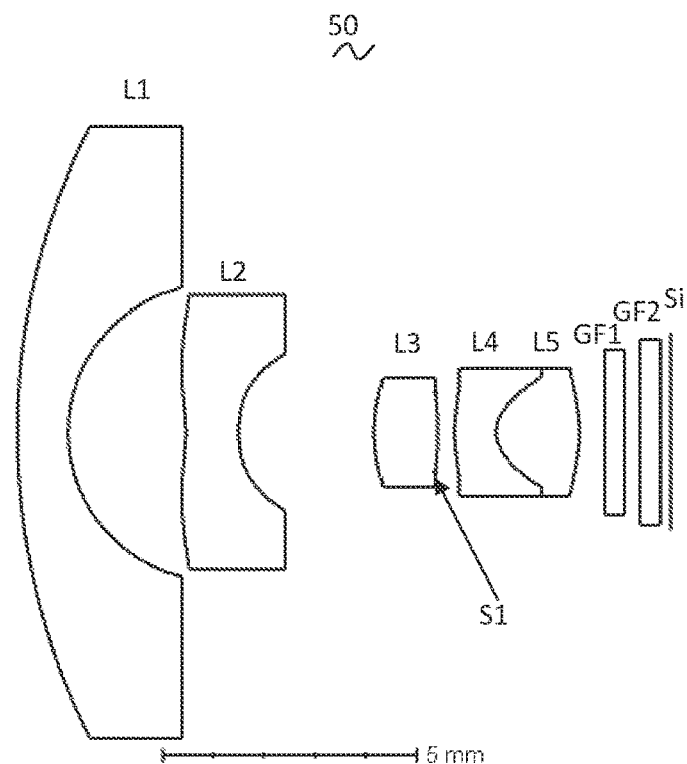
FIG. 17 is a schematic diagram of a structure of a camera optical lens in accordance with Embodiment 5 of the present invention.

FIG. 17 shows a schematic diagram of a structure of a camera optical lens 50 according to Embodiment 5 of the present invention. Tables 17 and 18 show the design data of a camera optical lens 50 in Embodiment 5 of the present invention.

TABLE 17

| | R | d | | nd | | vd |
|---|---|---|---|---|---|---|
| S1 | ∞ | d0= | −8.233 | | | |
| R1 | 13.464 | d1= | 1.000 | nd1 | 1.7125 | v1 | 50.02 |
| R2 | 2.941 | d2= | 2.315 | | | |
| R3 | −3.060 | d3= | 1.042 | nd2 | 1.5440 | v2 | 55.90 |
| R4 | 2.999 | d4= | 2.677 | | | |
| R5 | 3.339 | d5= | 1.247 | nd3 | 1.8697 | v3 | 29.90 |
| R6 | −6.530 | d6= | 0.334 | | | |
| R7 | 3.446 | d7= | 0.815 | nd4 | 1.6613 | v4 | 76.27 |
| R8 | 0.626 | d8= | 0.000 | | | |
| R9 | 0.626 | d9= | 1.645 | nd5 | 1.5440 | v5 | 55.90 |
| R10 | −2.746 | d10= | 0.500 | | | |
| R11 | ∞ | d11= | 0.400 | ndg1 | 1.5233 | vg1 | 54.52 |
| R12 | ∞ | d12= | 0.300 | | | |
| R13 | ∞ | d13= | 0.400 | ndg2 | 1.5168 | vg2 | 64.17 |
| R14 | ∞ | d14= | 0.199 | | | |

Table 18 shows aspheric data of each lens of the camera optical lens 50 in Embodiment 5 of the present invention.

TABLE 18

| | Conic coefficient | Aspheric coefficients | | | | | | |
|---|---|---|---|---|---|---|---|---|
| | k | A4 | A6 | A8 | A10 | A12 | A14 | A16 |
| R3 | −4.7071E+01 | 3.0611E−02 | −6.6133E−03 | 1.9298E−04 | 2.4398E−04 | −5.9518E−05 | 6.0128E−06 | −2.3539E−07 |
| R4 | 2.1906E+00 | 1.9822E−01 | −2.2371E−01 | 2.4851E−01 | −1.8754E−01 | 8.2815E−02 | −1.8832E−02 | 1.6342E−03 |
| R7 | 2.4244E−01 | −5.3074E−02 | 4.8626E−02 | −1.2358E−01 | 1.8772E−01 | −1.5125E−01 | 5.7395E−02 | −8.3677E−03 |
| R8 | −7.5973E−01 | −2.3356E−01 | 6.7644E−02 | 1.3177E−01 | −6.8367E−01 | 9.6251E−01 | −6.0045E−01 | 1.3520E−01 |
| R9 | −7.5973E−01 | −2.3356E−01 | 6.7644E−02 | 1.3177E−01 | −6.8367E−01 | 9.6251E−01 | −6.0045E−01 | 1.3520E−01 |
| R10 | −7.2671E+00 | 4.7968E−02 | −1.1986E−01 | 2.1027E−01 | −1.9767E−01 | 1.0371E−01 | −2.8589E−02 | 3.1232E−03 |

Table 19 and table 20 show Embodiment 5 design data of inflection points and stationary points of respective lens in the camera optical lens 50 according to Embodiment 5 of the present invention.

TABLE 19

| | Number of inflection points | Inflection point position 1 | Inflection point position 2 |
|---|---|---|---|
| P1R1 | 0 | / | / |
| P1R2 | 0 | / | / |
| P2R1 | 2 | 0.535 | 2.455 |
| P2R2 | 0 | / | / |
| P3R1 | 0 | / | / |
| P3R2 | 0 | / | / |
| P4R1 | 1 | 0.825 | / |
| P4R2 | 0 | / | / |
| P5R1 | 0 | / | / |
| P5R2 | 2 | 0.885 | 1.165 |

TABLE 20

| | Number of stationary points | Stationary point position 1 |
|---|---|---|
| P2R1 | 1 | 1.255 |

Figure 18:
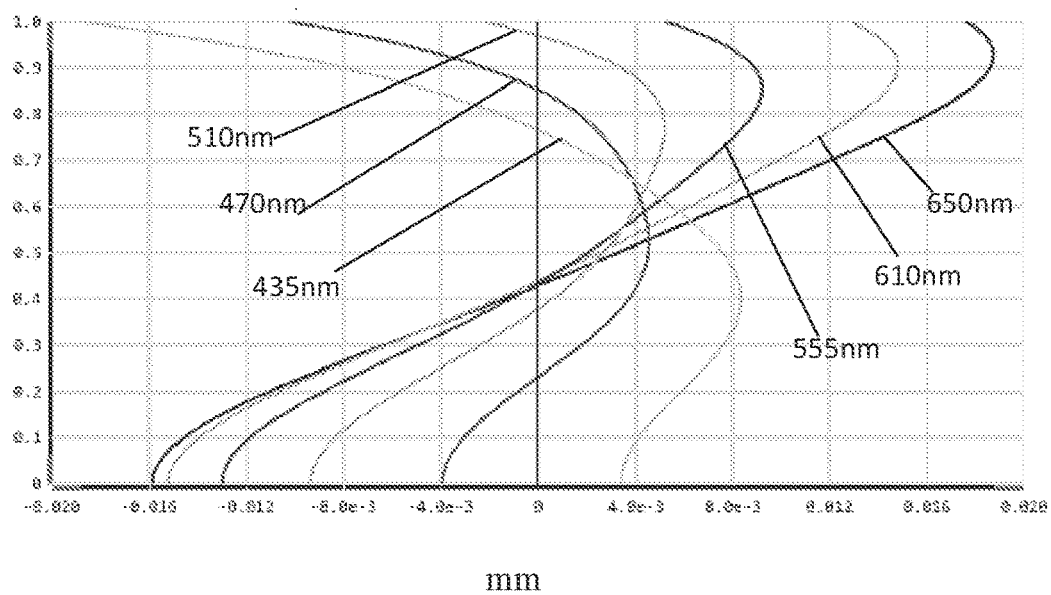
FIG. 18 is a schematic diagram of a longitudinal aberration of the camera optical lens shown in FIG. 17.
Figure 19:
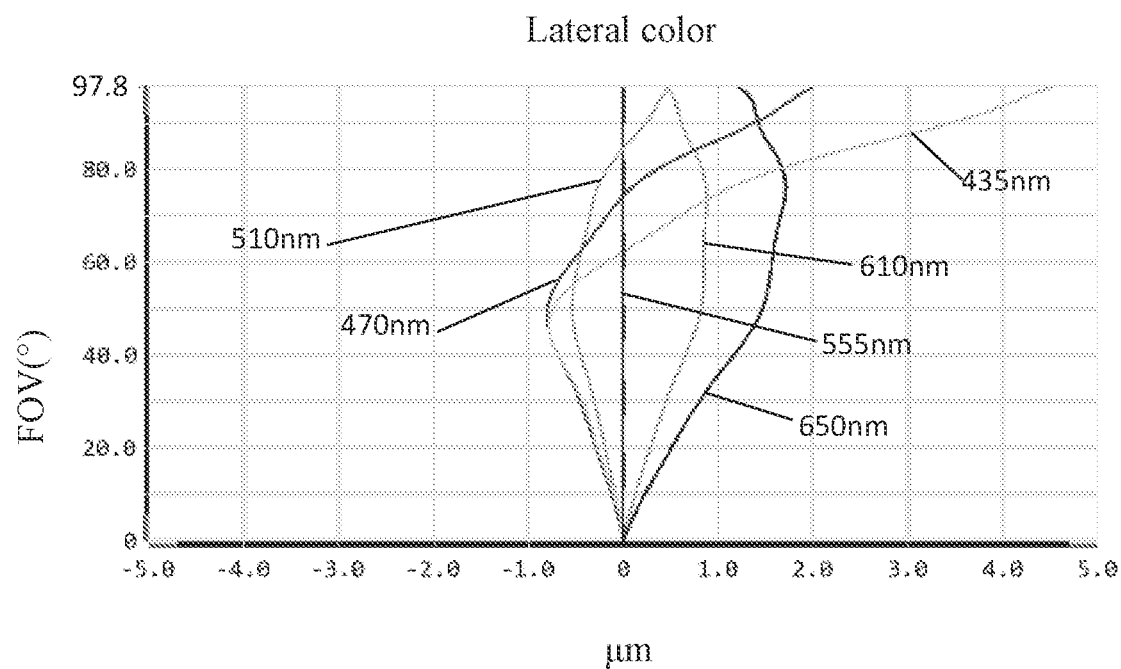
FIG. 19 is a schematic diagram of a lateral color of the camera optical lens shown in FIG. 17.
Figure 20:
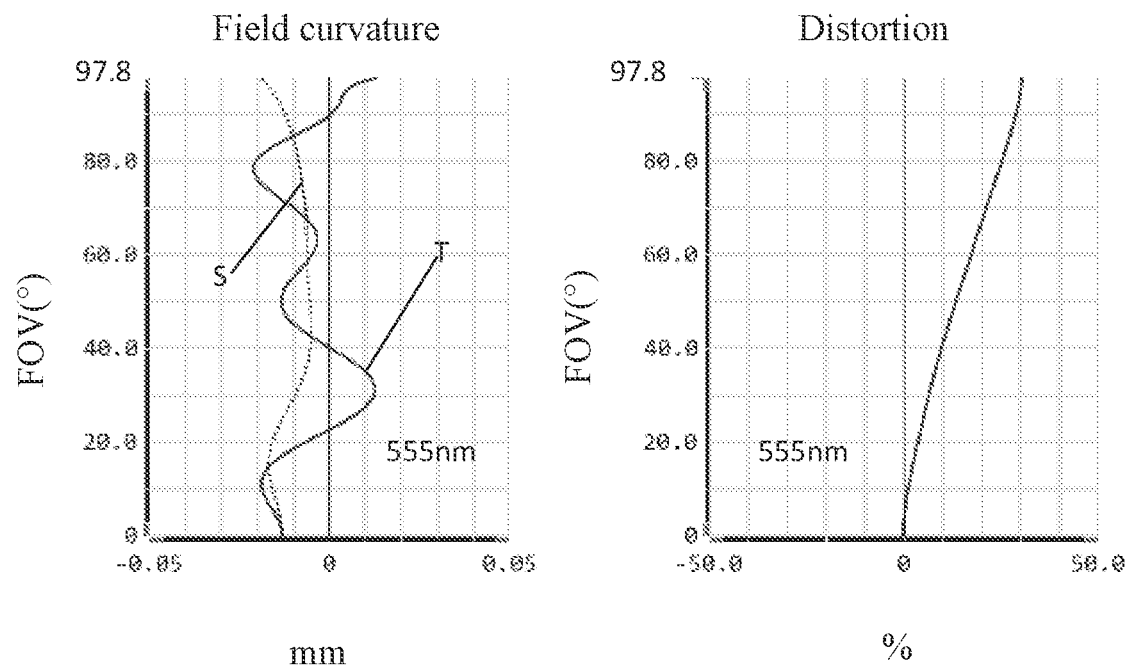
FIG. 20 is a schematic diagram of a field curvature and a distortion of the camera optical lens shown in FIG. 17.

FIG. 18 and FIG. 19 respectively illustrate a longitudinal aberration and a lateral color of light with wavelengths of 650 nm, 610 nm, 555 nm, 510 nm, 470 nm and 435 nm after passing the camera optical lens 50 according to Embodiment 5. FIG. 20 illustrates a field curvature and a distortion of light with a wavelength of 555 nm after passing the camera optical lens 50 according to Embodiment 5, in which a field curvature S is a field curvature in a sagittal direction and T is a field curvature in a tangential direction.

Table 33 in the following lists values corresponding to the respective conditions. Obviously, the camera optical lens 50 of the present embodiment satisfies the above-mentioned conditions.

In the present embodiment, an entrance pupil diameter (ENPD) of the camera optical lens is 0.417 mm. An image height of 1.0H is 1.920 mm. An diagonal FOV is 195.60°. Thus, the camera optical lens 50 satisfies design requirements of large apertures, ultra-thin and wide-angle.

Embodiment 6

Embodiment 6 is basically the same as Embodiment 1 and involves symbols having the same meanings as Embodiment 1, and only differences therebetween will be described in the following.

An image side surface of a third lens L3 is convex in a paraxial region.

Figure 21:
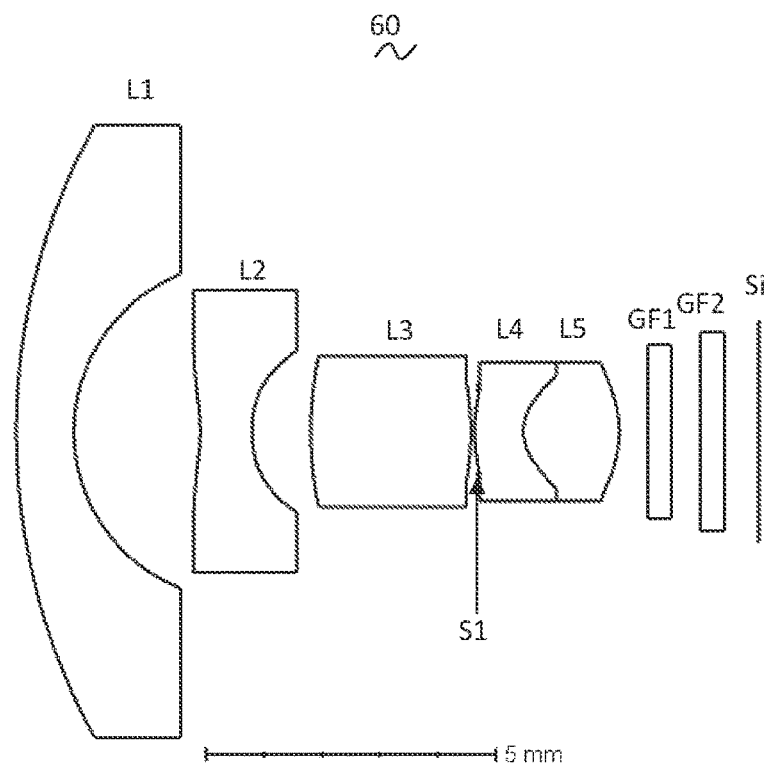
FIG. 21 is a schematic diagram of a structure of a camera optical lens in accordance with Embodiment 6 of the present invention.

FIG. 21 shows a schematic diagram of a structure of a camera optical lens 50 according to Embodiment 5 of the present invention. Tables 21 and 22 show the design data of a camera optical lens 60 in Embodiment 6 of the present invention.

TABLE 21

| | R | d | nd | vd |
|---|---|---|---|---|
| S1 | ∞ | d0= −7.975 | | |
| R1 | 10.970 | d1= 1.000 | nd1 1.8040 | v1 46.57 |
| R2 | 2.927 | d2= 2.177 | | |
| R3 | −2.884 | d3= 0.894 | nd2 1.5444 | v2 56.43 |
| R4 | 2.424 | d4= 1.019 | | |
| R5 | 6.359 | d5= 2.758 | nd3 1.9229 | v3 20.88 |
| R6 | −4.784 | d6= 0.070 | | |
| R7 | 3.052 | d7= 0.842 | nd4 1.6613 | v4 76.80 |
| R8 | 0.746 | d8= 0.000 | | |
| R9 | 0.746 | d9= 1.659 | nd5 1.5444 | v5 56.43 |

TABLE 21-continued

| | R | d | nd | vd |
|---|---|---|---|---|
| R10 | −1.823 | d10= 0.500 | | |
| R11 | ∞ | d11= 0.400 | ndg1 1.5233 | vg1 54.52 |
| R12 | ∞ | d12= 0.500 | | |
| R13 | ∞ | d13= 0.400 | ndg2 1.5168 | vg2 64.17 |
| R14 | ∞ | d14= 0.601 | | |

Table 22 shows aspheric data of each lens of the camera optical lens 60 in Embodiment 6 of the present invention.

TABLE 18

| | Conic coefficient | Aspheric coefficients | | | | | | |
|---|---|---|---|---|---|---|---|---|
| | k | A4 | A6 | A8 | A10 | A12 | A14 | A16 |
| R3 | −2.6361E+01 | 3.9879E−02 | −1.5349E−02 | 3.6604E−03 | −5.9678E−04 | 6.3199E−05 | −3.7941E−06 | 9.0933E−08 |
| R4 | 6.8710E−01 | 1.7532E−01 | −1.3827E−01 | 1.3839E−01 | −1.1542E−01 | 5.8198E−02 | −1.5011E−02 | 1.4686E−03 |
| R7 | −6.2438E+00 | −1.1484E−02 | 1.9383E−01 | −1.3403E+00 | 4.9301E+00 | −9.8740E+00 | 1.0084E+01 | −4.0882E+00 |
| R8 | −6.1996E−01 | −1.8632E−01 | 6.9675E−02 | −6.6477E−01 | 1.5033E+00 | −1.8591E+00 | 1.1943E+00 | −3.3261E−01 |
| R9 | −6.1996E−01 | −1.8632E−01 | 6.9675E−02 | −6.6477E−01 | 1.5033E+00 | −1.8591E+00 | 1.1943E+00 | −3.3261E−01 |
| R10 | −1.6836E+00 | 4.9032E−02 | −1.9371E−01 | 4.9821E−01 | −7.0544E−01 | 5.7102E−01 | −2.4482E−01 | 4.3333E−02 |

Table 23 and table 24 show Embodiment 6 design data of inflection points and stationary points of respective lens in the camera optical lens 60 according to Embodiment 6 of the present invention.

TABLE 23

| | Number of inflection points | Inflection point position 1 | Inflection point position 2 |
|---|---|---|---|
| P1R1 | 0 | / | / |
| P1R2 | 0 | / | / |
| P2R1 | 2 | 0.595 | 1.905 |
| P2R2 | 1 | 1.475 | / |
| P3R1 | 0 | / | / |
| P3R2 | 0 | / | / |
| P4R1 | 0 | / | / |
| P4R2 | 1 | 0.915 | / |
| P5R1 | 1 | 0.915 | / |
| P5R2 | 1 | 1.005 | / |

TABLE 24

| | Number of stationary points |
|---|---|
| Embodiment 6 | 0 |

Figure 22:
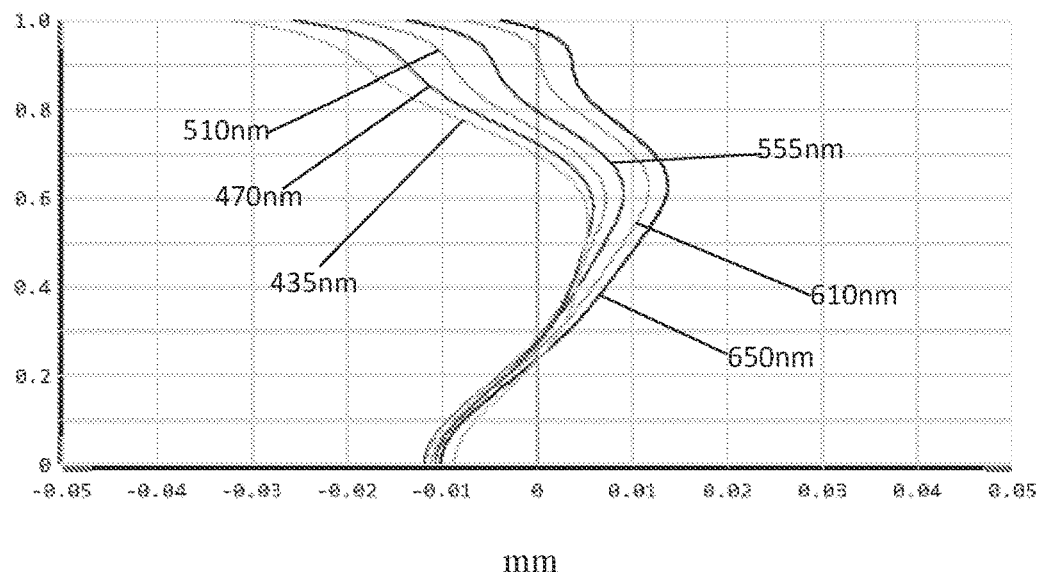
FIG. 22 is a schematic diagram of a longitudinal aberration of the camera optical lens shown in FIG. 21.
Figure 23:
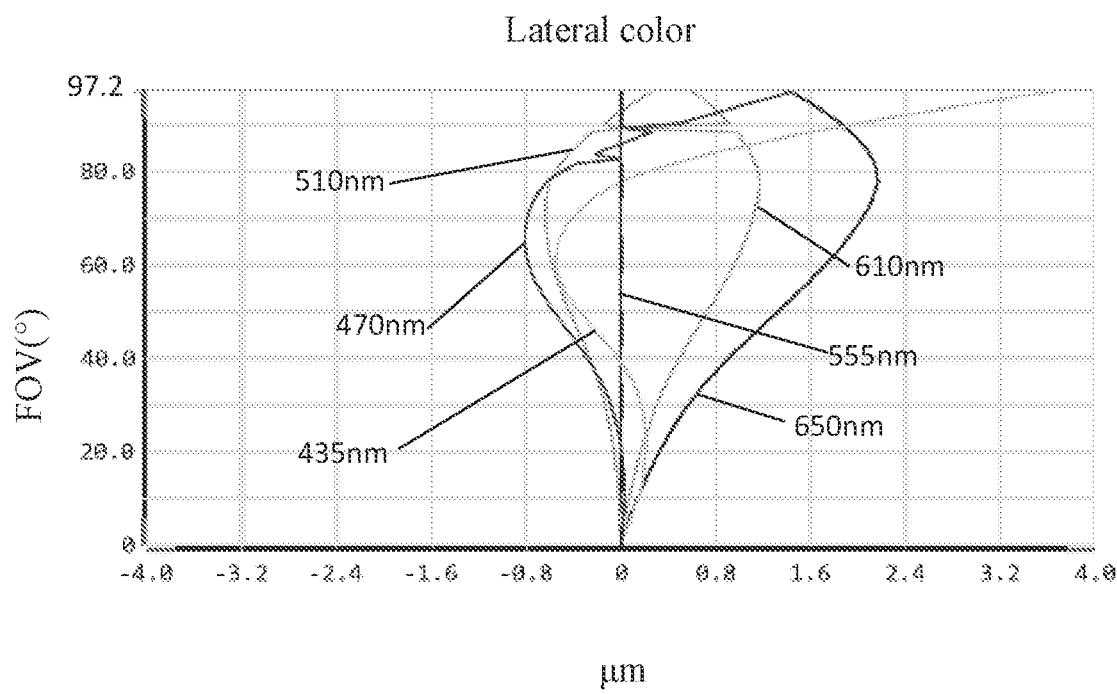
FIG. 23 is a schematic diagram of a lateral color of the camera optical lens shown in FIG. 21.
Figure 24:
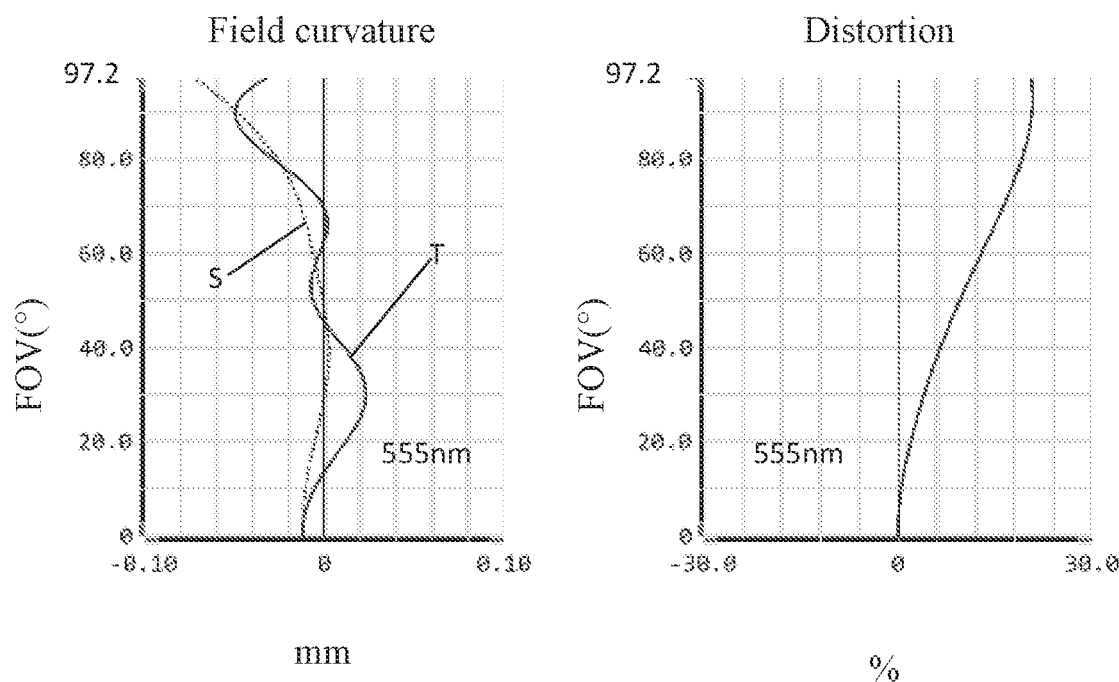
FIG. 24 is a schematic diagram of a field curvature and a distortion of the camera optical lens shown in FIG. 21.

FIG. 22 and FIG. 23 respectively illustrate a longitudinal aberration and a lateral color of light with wavelengths of 650 nm, 610 nm, 555 nm, 510 nm, 470 nm and 435 nm after passing the camera optical lens 60 according to Embodiment 6. FIG. 24 illustrates a field curvature and a distortion of light with a wavelength of 555 nm after passing the camera optical lens 60 according to Embodiment 6, in which a field curvature S is a field curvature in a sagittal direction and T is a field curvature in a tangential direction.

Table 33 in the following lists values corresponding to the respective conditions. Obviously, the camera optical lens 60 of the present embodiment satisfies the above-mentioned conditions.

In the present embodiment, an entrance pupil diameter (ENPD) of the camera optical lens is 0.455 mm. An image height of 1.0H is 1.920 mm. An diagonal FOV is 194.40°. Thus, the camera optical lens 50 satisfies design requirements of large apertures, ultra-thin and wide-angle and has excellent optical performance.

Embodiment 7

Embodiment 7 is basically the same as Embodiment 1 and involves symbols having the same meanings as Embodiment 1, and only differences therebetween will be described in the following.

An image side surface of a third lens L3 is convex in a paraxial region.

Figure 25:
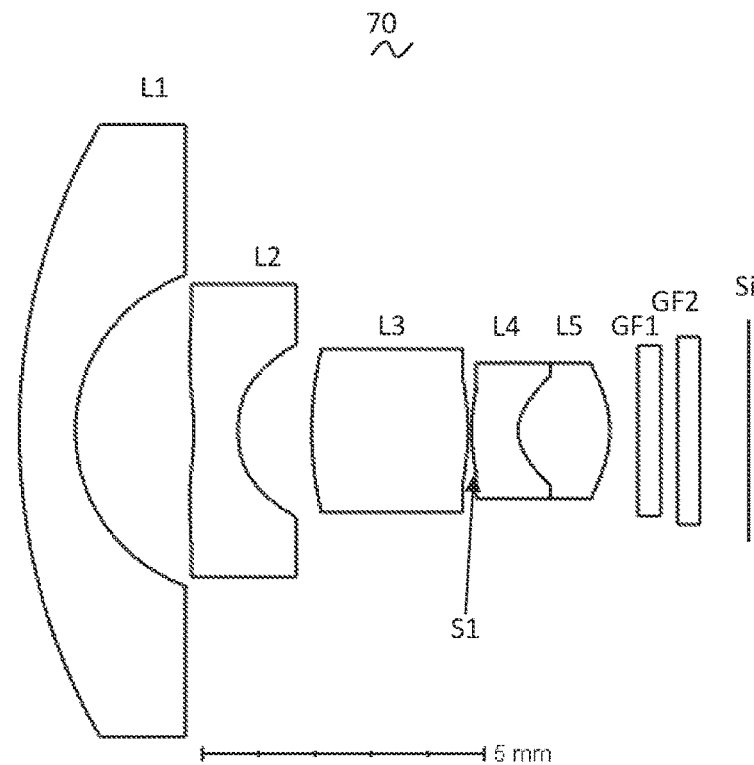
FIG. 25 is a schematic diagram of a structure of a camera optical lens in accordance with Embodiment 7 of the present invention.

FIG. 25 shows a schematic diagram of a structure of a camera optical lens 50 according to Embodiment 7 of the present invention. Tables 25 and 26 show the design data of a camera optical lens 70 in Embodiment 7 of the present invention.

TABLE 25

|     | R      | d     |       | nd     |     | vd    |
|-----|--------|-------|-------|--------|-----|-------|
| S1  | ∞      | d0=   | −8.084 |        |     |       |
| R1  | 10.970 | d1=   | 1.000 | nd1    | 1.8040 | v1 | 46.57 |
| R2  | 2.927  | d2=   | 2.097 |        |     |       |
| R3  | −3.271 | d3=   | 0.777 | nd2    | 1.5365 | v2 | 55.98 |
| R4  | 2.224  | d4=   | 1.315 |        |     |       |
| R5  | 6.359  | d5=   | 2.758 | nd3    | 1.9229 | v3 | 20.88 |
| R6  | −4.784 | d6=   | 0.066 |        |     |       |
| R7  | 3.119  | d7=   | 0.822 | nd4    | 1.6613 | v4 | 76.36 |
| R8  | 0.709  | d8=   | 0.000 |        |     |       |
| R9  | 0.709  | d9=   | 1.632 | nd5    | 1.5365 | v5 | 55.98 |
| R10 | −1.835 | d10=  | 0.500 |        |     |       |
| R11 | ∞      | d11=  | 0.400 | ndg1   | 1.5233 | vg1 | 54.52 |
| R12 | ∞      | d12=  | 0.300 |        |     |       |
| R13 | ∞      | d13=  | 0.400 | ndg2   | 1.5168 | vg2 | 64.17 |
| R14 | ∞      | d14=  | 0.851 |        |     |       |

Table 26 shows aspheric data of each lens of the camera optical lens 70 in Embodiment 7 of the present invention.

TABLE 26

|     | Conic coefficient | Aspheric coefficients | | | | | | |
|-----|---|---|---|---|---|---|---|---|
|     | k | A4 | A6 | A8 | A10 | A12 | A14 | A16 |
| R3  | −4.4987E+01 | 3.3895E−02 | −8.5162E−03 | 4.2888E−04 | 2.3341E−04 | −5.9518E−05 | 6.0128E−06 | −2.3539E−07 |
| R4  | 5.7908E−01 | 1.8728E−01 | −1.9530E−01 | 2.2924E−01 | −1.8399E−01 | 8.2815E−02 | −1.8832E−02 | 1.6342E−03 |
| R7  | −3.8065E+00 | −2.7585E−02 | 5.6153E−02 | −1.4190E−01 | 2.0033E−01 | −1.5125E−01 | 5.7395E−02 | −8.3677E−03 |
| R8  | −6.2768E−01 | −2.2255E−01 | −1.4640E−01 | 3.4768E−01 | −8.1532E−01 | 9.6251E−01 | −6.0045E−01 | 1.3520E−01 |
| R9  | −6.2768E−01 | −2.2255E−01 | −1.4640E−01 | 3.4768E−01 | −8.1532E−01 | 9.6251E−01 | −6.0045E−01 | 1.3520E−01 |
| R10 | −3.1698E+00 | 8.9559E−04 | −8.3883E−02 | 1.8214E−01 | −1.8635E−01 | 1.0371E−01 | −2.8589E−02 | 3.1232E−03 |

Table 27 and table 28 show Embodiment 7 design data of inflection points and stationary points of respective lens in the camera optical lens 70 according to Embodiment 7 of the present invention.

TABLE 27

|  | Number of inflection points | Inflection point position 1 | Inflection point position 2 |
|---|---|---|---|
| P1R1 | 0 | / | / |
| P1R2 | 0 | / | / |
| P2R1 | 2 | 0.535 | 1.845 |
| P2R2 | 1 | 1.525 | / |
| P3R1 | 0 | / | / |
| P3R2 | 0 | / | / |
| P4R1 | 0 | / | / |
| P4R2 | 1 | 0.935 | / |
| P5R1 | 1 | 0.935 | / |
| P5R2 | 1 | 1.045 | / |

TABLE 28

|  | Number of stationary points | Stationary point position 1 | Stationary point position 2 |
|---|---|---|---|
| P2R1 | 2 | 1.275 | 2.435 |

Figure 26:
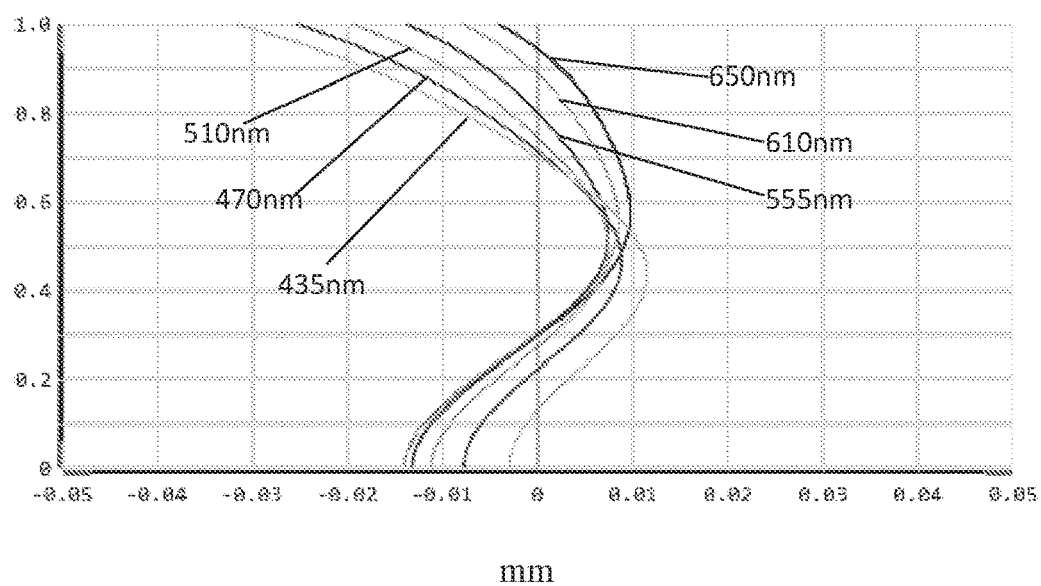
FIG. 26 is a schematic diagram of a longitudinal aberration of the camera optical lens shown in FIG. 25.
Figure 27:
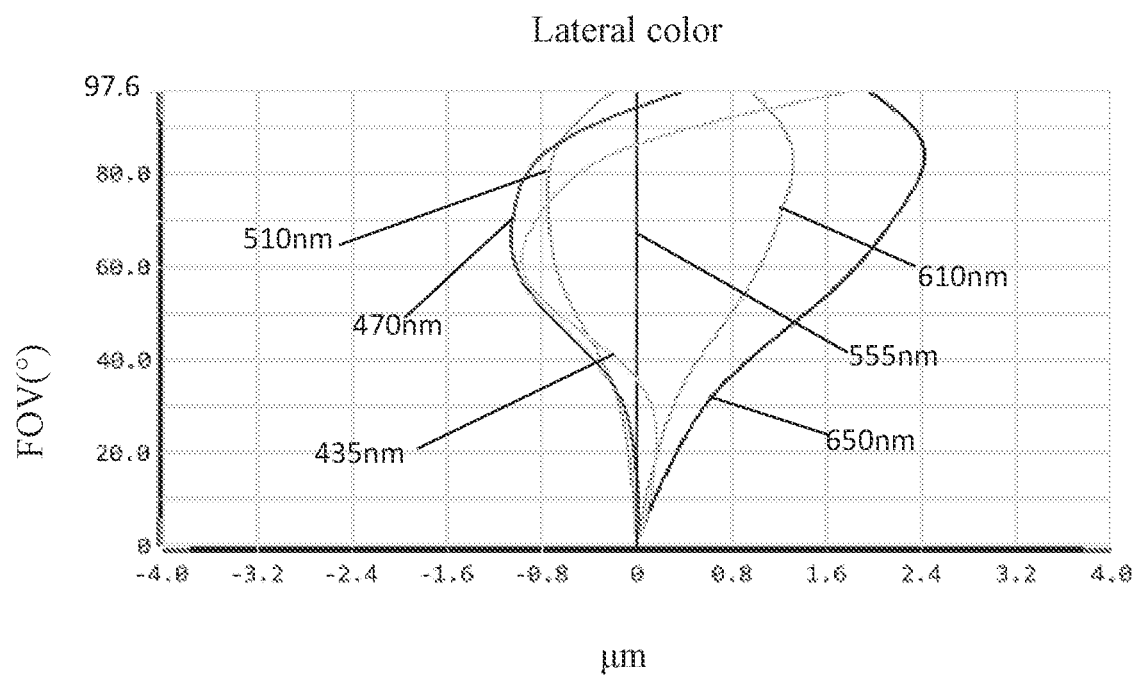
FIG. 27 is a schematic diagram of a lateral color of the camera optical lens shown in FIG. 25.
Figure 28:
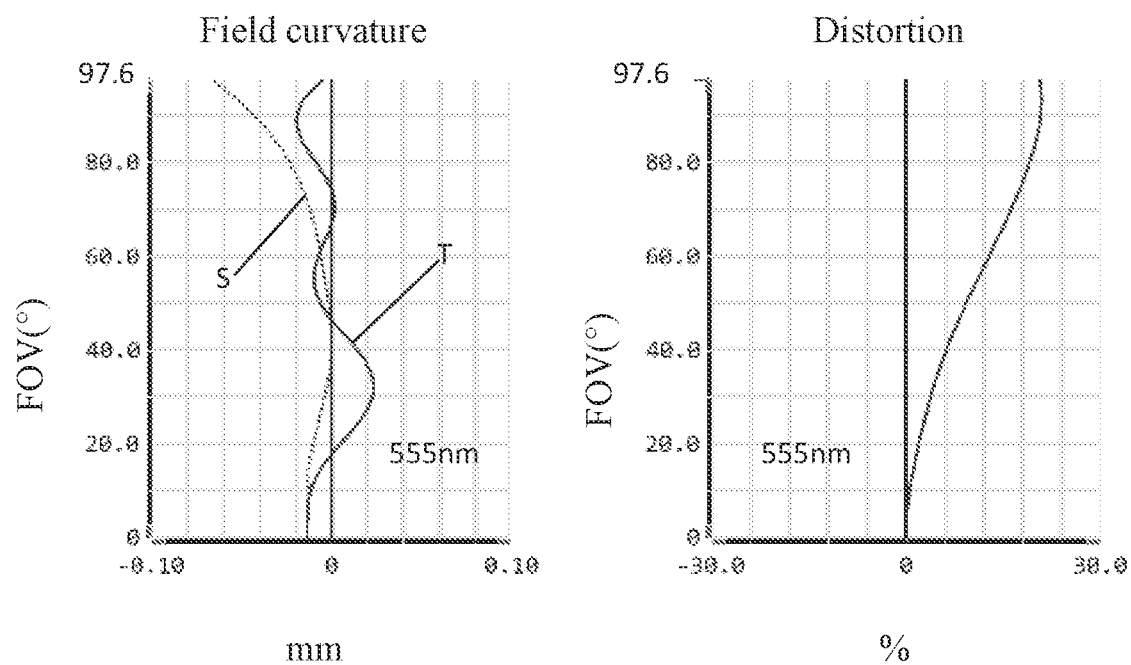
FIG. 28 is a schematic diagram of a field curvature and a distortion of the camera optical lens shown in FIG. 25.

FIG. 26 and FIG. 27 respectively illustrate a longitudinal aberration and a lateral color of light with wavelengths of 650 nm, 610 nm, 555 nm, 510 nm, 470 nm and 435 nm after passing the camera optical lens 70 according to Embodiment 7. FIG. 28 illustrates a field curvature and a distortion of light with a wavelength of 555 nm after passing the camera optical lens 70 according to Embodiment 7, in which a field curvature S is a field curvature in a sagittal direction and T is a field curvature in a tangential direction.

Table 33 in the following lists values corresponding to the respective conditions. Obviously, the camera optical lens 70 of the present embodiment satisfies the above-mentioned conditions.

In the present embodiment, an entrance pupil diameter (ENPD) of the camera optical lens is 0.455 mm. An image height of 1.0H is 1.920 mm. An diagonal FOV is 195.20°. Thus, the camera optical lens 50 satisfies design requirements of large apertures, ultra-thin and wide-angle, and has excellent optical performance.

Comparative Embodiment

Comparative Embodiment is basically the same as Embodiment 1 and involves symbols having the same meanings as Embodiment 1, and only differences therebetween will be described in the following.

Figure 29:
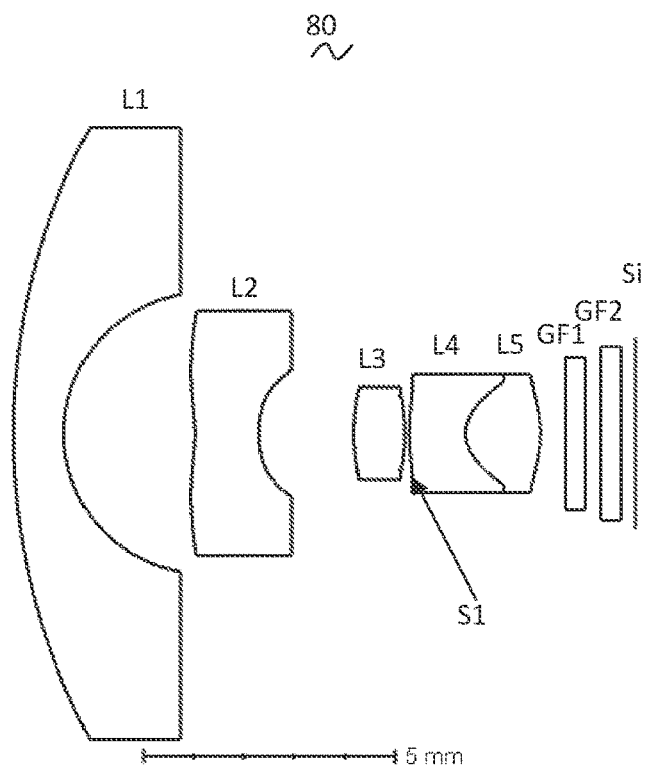
FIG. 29 is a schematic diagram of a structure of a camera optical lens in accordance with comparative Embodiment.

FIG. 29 shows a schematic diagram of a structure of a camera optical lens 80 according to Comparative Embodiment. Tables 29 and 30 show the design data of a camera optical lens 80 in Comparative Embodiment.

TABLE 29

|  | R |  | d | nd |  | vd |  |
|---|---|---|---|---|---|---|---|
| S1 | ∞ | d0= | −7.696 |  |  |  |  |
| R1 | 12.964 | d1= | 1.000 | nd1 | 1.7125 | v1 | 50.02 |
| R2 | 2.801 | d2= | 2.606 |  |  |  |  |
| R3 | −2.542 | d3= | 1.272 | nd2 | 1.5440 | v2 | 55.90 |
| R4 | 2.491 | d4= | 1.894 |  |  |  |  |
| R5 | 3.928 | d5= | 1.000 | nd3 | 1.8697 | v3 | 29.90 |
| R6 | −3.629 | d6= | 0.095 |  |  |  |  |
| R7 | 5.109 | d7= | 1.113 | nd4 | 1.6613 | v4 | 76.27 |
| R8 | 0.653 | d8= | 0.000 |  |  |  |  |
| R9 | 0.653 | d9= | 1.496 | nd5 | 1.5440 | v5 | 55.90 |
| R10 | −2.048 | d10= | 0.500 |  |  |  |  |
| R11 | ∞ | d11= | 0.400 | ndg1 | 1.5233 | vg1 | 54.52 |
| R12 | ∞ | d12= | 0.300 |  |  |  |  |
| R13 | ∞ | d13= | 0.400 | ndg2 | 1.5168 | vg2 | 64.17 |
| R14 | ∞ | d14= | 0.300 |  |  |  |  |

Table 30 shows aspheric data of each lens of the camera optical lens 80 in Comparative Embodiment of the present invention.

TABLE 30

|  | Conic coefficient | Aspheric coefficients | | | | | | |
|---|---|---|---|---|---|---|---|---|
|  | k | A4 | A6 | A8 | A10 | A12 | A14 | A16 |
| R3 | −5.0371E+01 | 3.0806E−02 | −6.6726E−03 | 1.8962E−04 | 2.4439E−04 | −5.9518E−05 | 6.0128E−06 | −2.3539E−07 |
| R4 | 2.2483E+00 | 2.0332E−01 | −2.2890E−01 | 2.5159E−01 | −1.8828E−01 | 8.2815E−02 | −1.8832E−02 | 1.6342E−03 |
| R7 | −5.5655E−01 | −4.4396E−01 | 4.0147E−02 | −1.0594E−01 | 1.7518E−01 | −1.5125E−01 | 5.7395E−02 | −8.3677E−03 |
| R8 | −7.5239E−01 | −1.9465E−01 | −7.0878E−04 | 2.2385E−01 | −7.2858E−01 | 9.6251E−01 | −6.0045E−01 | 1.3520E−01 |
| R9 | −7.5239E−01 | −1.9465E−01 | −7.0878E−04 | 2.2385E−01 | −7.2858E−01 | 9.6251E−01 | −6.0045E−01 | 1.3520E−01 |
| R10 | −5.7875E+00 | 6.3848E−02 | −1.2903E−01 | 2.2197E−01 | −2.0292E−01 | 1.0371E−01 | −2.8589E−02 | 3.1232E−03 |

Table 31 and table 32 show Comparative Embodiment design data of inflection points and stationary points of respective lens in the camera optical lens 80 according to Comparative Embodiment of the present invention.

TABLE 31

|  | Number of inflection points | Inflection point position 1 | Inflection point position 2 |
|---|---|---|---|
| P1R1 | 0 | / | / |
| P1R2 | 0 | / | / |
| P2R1 | 2 | 0.505 | 2.395 |
| P2R2 | 0 | / | / |
| P3R1 | 0 | / | / |
| P3R2 | 0 | / | / |
| P4R1 | 1 | 0.715 | / |
| P4R2 | 1 | 1.025 | / |
| P5R1 | 1 | 1.025 | / |
| P5R2 | 2 | 0.775 | 1.115 |

TABLE 32

| | Number of stationary points | Stationary point position 1 |
|---|---|---|
| P2R1 | 1 | 1.245 |

Figure 30:
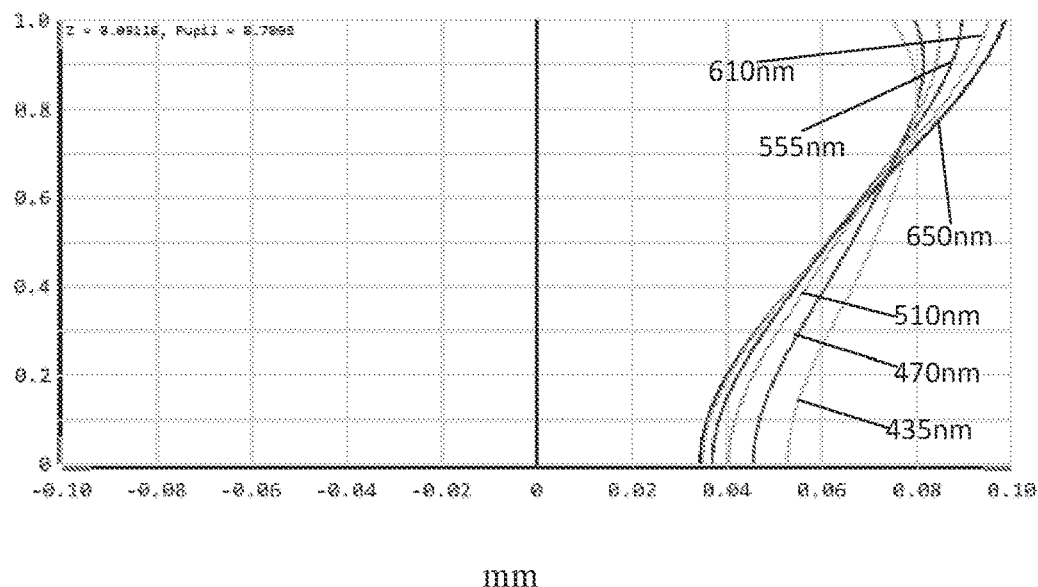
FIG. 30 is a schematic diagram of a longitudinal aberration of the camera optical lens shown in FIG. 29.
Figure 31:
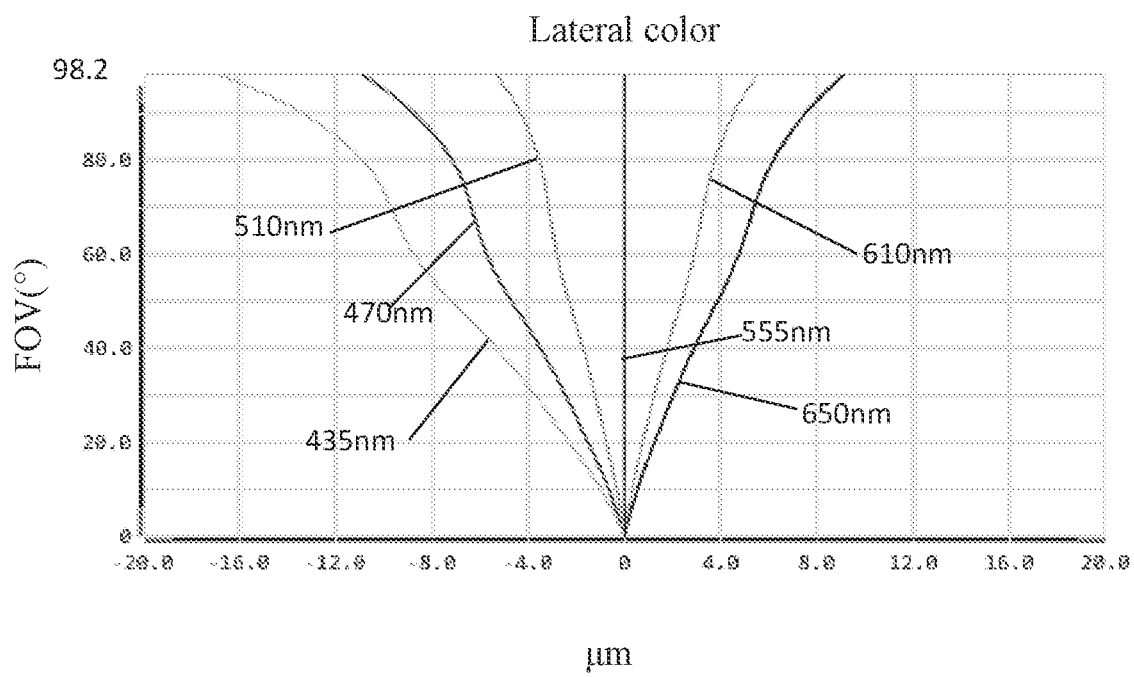
FIG. 31 is a schematic diagram of a lateral color of the camera optical lens shown in FIG. 29.
Figure 32:
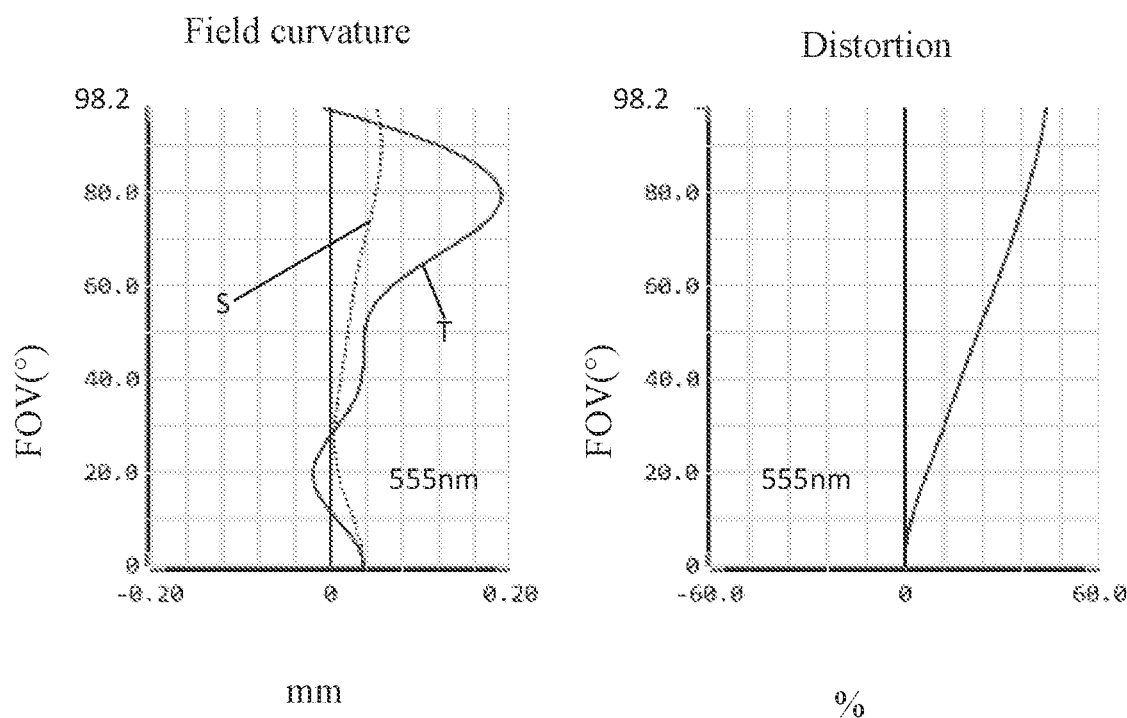
FIG. 32 is a schematic diagram of a field curvature and a distortion of the camera optical lens shown in FIG. 29.

FIG. 30 and FIG. 31 respectively illustrate a longitudinal aberration and a lateral color of light with wavelengths of 650 nm, 610 nm, 555 nm, 510 nm, 470 nm and 435 nm after passing the camera optical lens 80 according to Comparative Embodiment. FIG. 32 illustrates a field curvature and a distortion of light with a wavelength of 555 nm after passing the camera optical lens 80 according to Comparative Embodiment, in which a field curvature S is a field curvature in a sagittal direction and T is a field curvature in a tangential direction.

Table 33 in the following lists values corresponding to the respective conditions. The camera optical lens 80 according to Comparative Embodiment does not satisfy the above condition 12.00≤TTL/f≤15.00.

In the present embodiment, an entrance pupil diameter (ENPD) of the camera optical lens 80 is 0.390 mm. An image height of 1.0H is 1.920 mm. A diagonal FOV is 196.40°. Thus, the camera optical lens 80 does not satisfy design requirements of large aperture, ultra-thin and wide-angle. The on-axis and off-axis chromatic aberrations are not sufficiently corrected.

TABLE 33

| Parameters and conditions | Embodiment 1 | Embodiment 2 | Embodiment 3 | Embodiment 4 | Embodiment 5 | Comparative Embodiment |
|---|---|---|---|---|---|---|
| TTL/f | 12.042 | 12.501 | 12.995 | 14.503 | 14.970 | 13.755 |
| (R3 + R4)/(R3 − R4) | 0.990 | 0.800 | 0.600 | 0.400 | 0.010 | 0.087 |
| f45/f | 2.099 | 2.999 | 3.998 | 5.002 | 5.989 | 3.387 |
| d4/d6 | 29.917 | 25.000 | 18.000 | 12.015 | 8.015 | 14.557 |
| R7/R8 | 1.507 | 2.540 | 4.898 | 6.550 | 5.505 | 4.091 |
| f | 0.994 | 0.916 | 0.955 | 0.902 | 0.860 | 0.932 |
| f1 | −5.159 | −4.988 | −5.746 | −5.719 | −5.480 | −5.238 |
| f2 | −2.231 | −1.961 | −2.466 | −2.474 | −2.616 | −2.276 |
| f3 | 4.402 | 3.028 | 2.942 | 2.709 | 2.683 | 3.330 |
| f4 | −9.872 | −2.497 | −1.392 | −1.226 | −1.296 | −1.732 |
| f5 | 1.474 | 1.265 | 1.149 | 1.142 | 1.128 | 1.256 |
| FNO | 2.001 | 2.051 | 2.075 | 2.064 | 2.065 | 2.048 |
| TTL | 11.970 | 11.451 | 12.410 | 13.082 | 12.874 | 12.820 |
| IH | 1.920 | 1.920 | 1.920 | 1.920 | 1.920 | 1.920 |
| FOV | 195.60 | 195.60 | 195.60 | 195.60 | 195.60 | 194.40 |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens comprising, from an object side to an image side in sequence: a first lens having a negative refractive power, a second lens having a negative refractive power, a third lens having a positive refractive power, a fourth lens having a negative refractive power, and a fifth lens having a positive refractive power; wherein the camera optical lens satisfies the following conditions:

$12.00 \leq TTL/f \leq 15.00$;

$TTL/IH \leq 7.15$;

$2.00 \leq f45/f \leq 6.00$;

$0 \leq (R3+R4)/(R3-R4) < 1.00$; and $8.00 \leq d4/d6 \leq 30.00$;

where,
f: a focal length of the camera optical lens;
TTL: a total optical length of the camera optical lens;
IH: an image height of the camera optical lens;
f45: a combined focal length of the fourth lens and the fifth lens;
R3: a central curvature radius of an object side surface of the second lens;
R4: a central curvature radius of an image side surface of the second lens;
d4: an on-axis distance from an image side surface of the second lens to an object side surface of the third lens;
d6: an on-axis distance from an image side surface of the third lens to an object side surface of the fourth lens.

2. The camera optical lens according to claim 1 further satisfying the following condition: $1.50 \leq R7/R8 \leq 8.00$, where,
R7: a central curvature radius of an object side surface of the fourth lens;
R8: a central curvature radius of an image side surface of the fourth lens.

3. The camera optical lens according to claim 1, wherein, the first lens has an object side surface being convex in a paraxial region and the first lens has an image side surface being concave in a paraxial region; the camera optical lens further satisfies the following conditions:

$-12.74 \leq f1/f \leq -3.46$;

$0.78 \leq (R1+R2)/(R1-R2) \leq 2.77$; and $0.04 \leq d1/TTL \leq 0.14$;

where,
f1: a focal length of the first lens;
R1: a central curvature radius of an object side surface of the first lens;
R2: a central curvature radius of the image side surface of the first lens; and
d1: an on-axis thickness of the first lens.

4. The camera optical lens according to claim 1, wherein, the second lens has an object side surface being concave in a paraxial region and the second lens has an image side surface being concave in a paraxial region; the camera optical lens further satisfying the following conditions:

$-6.08 \leq f2/f \leq -1.43$; and $0.03 \leq d3/TTL \leq 0.12$;

where, f2: a focal length of the second lens;

d3: an on-axis thickness of the second lens.

5. The camera optical lens according to claim 1 wherein, the third lens has an object side surface being convex in a paraxial region; the camera optical lens further satisfying the following conditions:

$1.50 \leq f3/f \leq 6.64$;

$-15.66 \leq (R5+R6)/(R5-R6) \leq 0.21$; and $0.05 \leq d5/TTL \leq 0.32$;

where, f3: a focal length of the third lens;

R5: denotes a central curvature radius of an object side surface of the third lens;

R6: denotes a central curvature radius of an image side surface of the third lens, d5: an on-axis thickness of the third lens.

6. The camera optical lens according to claim 1, wherein, the object side surface of the fourth lens is convex in a paraxial region and the image side surface of the fourth lens is concave in the paraxial region; the camera optical lens further satisfies the following conditions:

$-19.86 \leq f4/f \leq -0.91$; and $0.03 \leq d7/TTL \leq 0.10$;

where, f4: a focal length of the fourth lens;

d7: an on-axis thickness of the fourth lens.

7. The camera optical lens according to claim 1, wherein, the object side surface of the fifth lens is convex in a paraxial region and the image side surface of the fifth lens is convex in the paraxial region; the camera optical lens further satisfies the following conditions:

$0.60 \leq f5/f \leq 2.22$;

$-1.26 \leq (R9+R10)/(R9-R10) \leq -0.21$; and $0.06 \leq d9/TTL \leq 0.19$;

where, f5: a focal length of the fifth lens;

R9 denotes a central curvature radius of an object side surface of the fifth lens;

R10 denotes a central curvature radius of an image side surface of the fifth lens;

d9: an on-axis thickness of the fifth lens.

8. The camera optical lens according to claim 1, the first lens is made from glass material and the third lens is made from glass material.

9. The camera optical lens according to claim 1 further satisfying the following condition: $FOV \geq 190.00°$;

where,

FOV: a field of view of the camera optical lens in a diagonal direction.

* * * * *